United States Patent
Jo et al.

(10) Patent No.: US 10,114,514 B2
(45) Date of Patent: Oct. 30, 2018

(54) ELECTRONIC DEVICE, METHOD FOR CONTROLLING THE ELECTRONIC DEVICE, AND RECORDING MEDIUM

(71) Applicant: Samsung Electronics Co., Ltd., Suwon-si, Gyeonggi-do (KR)

(72) Inventors: Jae-Hong Jo, Suwon-si (KR); Ji-Yeon Han, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 14/837,476

(22) Filed: Aug. 27, 2015

(65) Prior Publication Data

US 2016/0062514 A1    Mar. 3, 2016

(30) Foreign Application Priority Data

Sep. 1, 2014 (KR) .................. 10-2014-0115421

(51) Int. Cl.
| | |
|---|---|
| G06F 3/044 | (2006.01) |
| G06F 3/01 | (2006.01) |
| G02B 27/01 | (2006.01) |
| G06F 3/041 | (2006.01) |

(52) U.S. Cl.
CPC .......... G06F 3/044 (2013.01); G02B 27/017 (2013.01); G02B 27/0172 (2013.01); G06F 3/011 (2013.01); G06F 3/013 (2013.01); G06F 3/0412 (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 5,511,185 A | 4/1996 | Weinbaum et al. | |
| 5,577,961 A * | 11/1996 | Adamczyk | G06F 3/011 345/419 |
| 5,844,530 A | 12/1998 | Tosaki | |
| 8,235,529 B1 * | 8/2012 | Raffle | A61B 3/113 351/209 |
| 8,686,924 B2 | 4/2014 | Braun et al. | |
| 2004/0104864 A1 * | 6/2004 | Nakada | G02B 27/017 345/8 |

(Continued)

FOREIGN PATENT DOCUMENTS

| | | |
|---|---|---|
| CN | 103713387 A | 4/2014 |
| CN | 103812761 A | 5/2014 |

(Continued)

*Primary Examiner* — David D Davis
(74) *Attorney, Agent, or Firm* — Jefferson IP Law, LLP

(57) ABSTRACT

An electronic device, a method for controlling the electronic device, and a recording medium are provided. The electronic device includes a display, a storage module, and a processor configured to detect a reference screen setting event in relation to a screen being displayed on the display module and to control the storage module to store at least part of information about the screen being displayed on the display as a reference screen information. Upon occurring of a reference screen display event, the processor controls the display to display a reference screen based on the stored reference screen information.

12 Claims, 38 Drawing Sheets

(56) References Cited

U.S. PATENT DOCUMENTS

| | | | |
|---|---|---|---|
| 2006/0115130 A1* | 6/2006 | Kozlay | G02B 27/0093 |
| | | | 382/117 |
| 2008/0246693 A1 | 10/2008 | Hailpern et al. | |
| 2010/0079356 A1* | 4/2010 | Hoellwarth | G02B 27/017 |
| | | | 345/8 |
| 2010/0315329 A1 | 12/2010 | Previc et al. | |
| 2013/0207991 A1* | 8/2013 | Sato | G02B 27/01 |
| | | | 345/589 |
| 2013/0335303 A1 | 12/2013 | Maciocci et al. | |
| 2014/0015736 A1 | 1/2014 | Kim | |
| 2014/0132630 A1 | 5/2014 | Mun et al. | |
| 2014/0139551 A1* | 5/2014 | McCulloch | G09G 5/377 |
| | | | 345/633 |
| 2014/0145914 A1* | 5/2014 | Latta | G06F 1/3215 |
| | | | 345/8 |
| 2014/0192085 A1 | 7/2014 | Kim | |
| 2014/0215495 A1 | 7/2014 | Erich et al. | |
| 2014/0232641 A1* | 8/2014 | Sendai | G06F 3/011 |
| | | | 345/156 |

FOREIGN PATENT DOCUMENTS

| | | |
|---|---|---|
| EP | 0677961 A2 | 10/1995 |
| EP | 2768218 A1 | 8/2014 |
| JP | 2006-155574 A | 6/2006 |
| JP | 3790996 A | 6/2006 |
| JP | 2009-265906 A | 11/2009 |
| KR | 10-2014-0035861 A | 3/2014 |
| KR | 10-2014-0064384 A | 5/2014 |
| KR | 10-2014-0089184 A | 7/2014 |
| WO | 2015-183621 A1 | 12/2015 |

\* cited by examiner

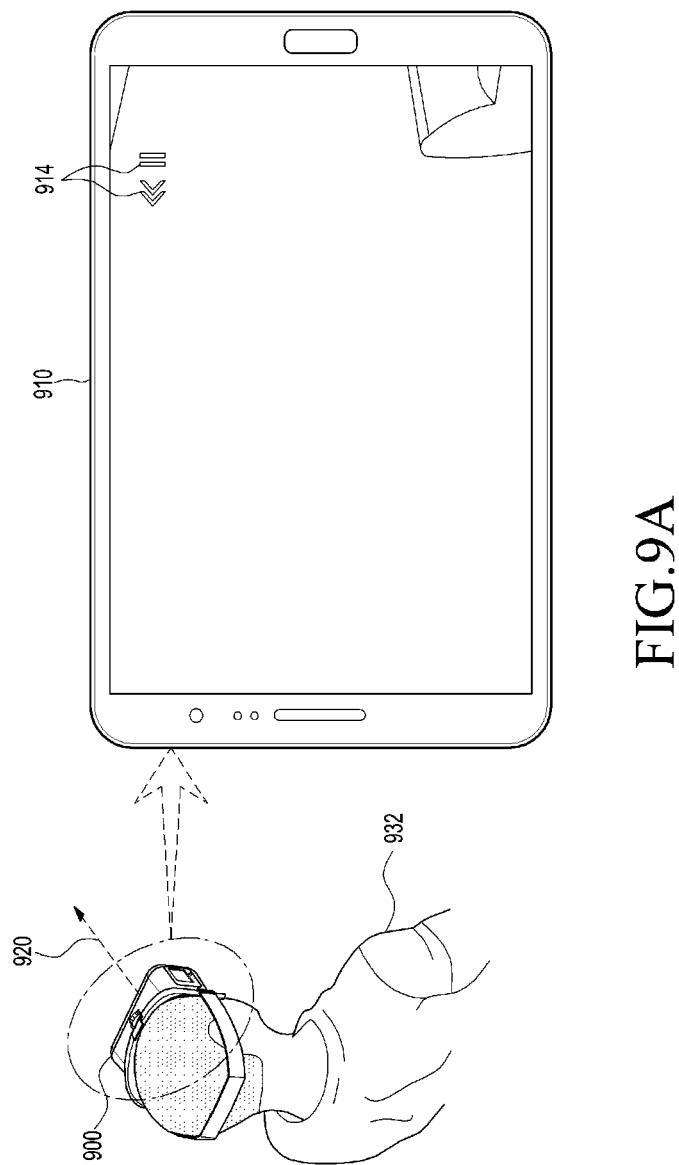

ELECTRONIC DEVICE, METHOD FOR CONTROLLING THE ELECTRONIC DEVICE, AND RECORDING MEDIUM

CROSS-REFERENCE TO RELATED APPLICATION(S)

This application claims the benefit under 35 U.S.C. § 119(a) of a Korean patent application filed in the Korean Intellectual Property Office on Sep. 1, 2014 and assigned Serial number 10-2014-0115421, the entire disclosure of which is hereby incorporated by reference.

TECHNICAL FIELD

The present disclosure relates to an electronic device, a method for controlling the electronic device, and a recording medium.

BACKGROUND

Some electronic devices are wearable on a human body. These electronic devices are typically referred to as wearable devices. Among the wearable devices, there is a head-mounted electronic device such as a head mounted display (HMD).

The HMD is worn around a user's body part (for example, a user's head) and provides a virtual reality (VR) environment to the user. The provisioning of the VR environment may mean that a screen and various user interfaces (UIs) for implementing a VR are displayed and provided.

If the user takes off the related-art HMD and then the user or another user puts it on, a different screen from a screen displayed at the moment when the HMD was taken off may be displayed according to a view point of the user. Therefore, if the user wants to show an image displayed on the HMD to another user and an eye direction of the other user is different from that of the user, an unintended screen may be shown to the other user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, a method for controlling the electronic device, and a recording medium, which facilitate switching to a determined reference screen without the need for a user's moving the eyes to see the reference screen, through a request for displaying the reference screen to a head-mounted electronic device.

In accordance with an aspect of the present disclosure, an electronic device is provided. The electronic device includes a display, a storage module, and a processor configured to detect a reference screen setting event in relation to a screen being displayed on the display and control the storage module to store at least part of information about the screen being displayed on the display module as a reference screen information. Upon occurring (or, generation) of a reference screen display event, the processor controls the display to display a reference screen based on the stored reference screen information.

In accordance with another aspect of the present disclosure, a method for controlling an electronic device is provided. The method includes detecting a reference screen setting event in relation to a screen being displayed on the electronic device, storing at least part of information about the screen being displayed on the electronic device as a reference screen information in response to the detected reference screen setting event, detecting a reference screen display event, and displaying a reference screen based on the stored reference screen information in response to the reference screen display event.

In accordance with another aspect of the present disclosure, a computer-readable recording medium storing an instruction for performing at least one operation by a processor is provided. The at least one operation includes detecting a reference screen setting event in relation to a screen being displayed on the electronic device, storing at least part of information about the screen being displayed on the electronic device as a reference screen information in response to the detected reference screen setting event, detecting a reference screen display event, and displaying a reference screen based on the stored reference screen information in response to the reference screen display event.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A, 9B, and 9C are views illustrating an operation for, when a first electronic device according to various embodiments of the present disclosure is removed and then re-worn, controlling a screen that was displayed according to a view point of the user at the moment of the removal;

Throughout the drawings, like reference numerals will be understood to refer to like parts, components, and structures.

DETAILED DESCRIPTION

Figure 1:
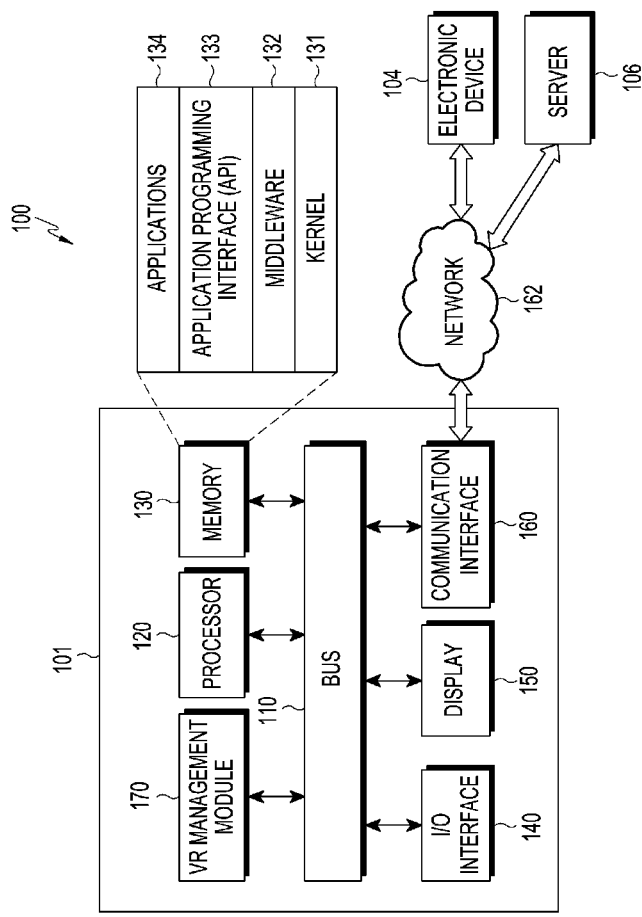
FIG. 1 is a conceptual view illustrating a network environment that includes an electronic device according to various embodiments of the present disclosure or that includes an electronic device to which a method for controlling the electronic device is applicable.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may be a device with communication functionality. For example, the electronic device may be at least one of a smart phone, a tablet personal computer (PC), a mobile phone, a video phone, an e-Book reader, a desktop PC, a laptop PC, a Netbook computer, a personal digital assistant (PDA), a portable multimedia player (PMP), a digital audio player, a mobile medical device, a camera, and a wearable device (for example, a head-mounted device (HMD) such as electronic glasses, electronic clothes, an electronic bracelet, an electronic necklace, an electronic Accessory, an electronic tattoo, or a smart watch).

According to some embodiments, an electronic device may be a smart home appliance with communication functionality. For example, the smart home appliance may be at least one of a television (TV), a digital versatile disk (DVD) player, an audio player, a refrigerator, an air conditioner, a vacuum cleaner, an oven, a micro oven, a washer, an air purifier, a set-top box, a TV box (for example, Samsung HomeSync™, Apple TV™, Google TV™, or the like), a game console, an electronic dictionary, an electronic key, a camcorder, an electronic picture frame, and the like.

According to some embodiments, an electronic device may be at least one of a medical device (for example, a magnetic resonance angiography (MRA) device, a magnetic resonance imaging (MRI) device, a computed tomography (CT) device, an imaging device, an ultrasonic device, or the like), a navigation device, a global positioning system (GPS) receiver, an event data recorder (EDR), a flight data recorder (FDR), an automotive infotainment device, a naval electronic device (for example, a naval navigation device, a gyro compass, or the like), an avionic electronic device, a security device, an in-vehicle head unit, an industrial or consumer robot, an automatic teller machine (ATM) in a financial facility, a point of sales (POS) device in a shop, and the like.

According to some embodiments, an electronic device may be at least one of furniture, part of a building/structure, an electronic board, an electronic signature receiving device, a projector, or various measuring devices (for example, water, electricity, gas or electro-magnetic wave measuring devices), which include communication functionality. An electronic device according to various embodiments of the present disclosure may be one or a combination of two or more of the foregoing devices. In addition, it will be apparent to one having ordinary skill in the art that an electronic device according to various embodiments of the present disclosure is not limited to the foregoing devices.

Now a description will be given of an electronic device according to various embodiments of the present disclosure with reference to the attached drawings. The term 'user' used in various embodiments of the present disclosure may refer to a person using an electronic device or a device (for example, an artificial intelligence electronic device) using an electronic device.

FIG. 1 is a conceptual view illustrating a network environment 100 that includes an electronic device according to various embodiments of the present disclosure or that includes an electronic device to which a method for controlling the electronic device is applicable.

Referring to FIG. 1, an electronic device 101 may include a bus 110, a processor 120, a memory 130, an input/output (I/O) module 140, a display 150, a communication interface 160, and a virtual reality (VR) management module 170.

The bus 110 may be a circuit that connects the foregoing components and allows communication (for example, control messages) between the foregoing components.

The processor 120 may, for example, receive instructions from other components (for example, the memory 130, the I/O interface 140, the display 150, or the communication interface 160), interpret the received instructions, and execute computation or data processing according to the interpreted instructions.

The memory 130 may, for example, store instructions or data that are received from, or generated by, other components (for example, the I/O interface 140, the display module 150, the communication interface 160, or the VR management module 170). For example, the memory 130 may include programming modules such as a kernel 131, a middleware 132, an application programming interface (API) 133, or an application 134. Each of the foregoing programming modules may include software, firmware, hardware, or a combination of at least two of software, firmware, and hardware.

The kernel 131 may control or manage system resources (for example, the bus 110, the processor 120, or the memory 130) that are used in executing operations or functions implemented in other programming modules such as the middleware 132, the API 133, or the application 134. Also, the kernel 131 may provide an interface for allowing the middleware 132, the API 133, or the application 134 to access and control or manage individual components of the electronic device 101.

The middleware 132 may be a medium through which the kernel 131 may communicate with the API 133 or the application 134 to transmit and receive data. Also, the middleware 132 may perform control operations (for example, scheduling or load balancing) in regard to work requests by one or more applications 134 by, for example, assigning priorities for using system resources (the bus 110, the processor 120, or the memory 130) of the electronic device 101 to the one or more applications 134.

The API 133 is an interface that may control functions that the application 134 provides at the kernel 131 or the middleware 132. For example, the API 133 may include at least one interface or function (for example, a command) for file control, window control, video processing, or text control.

According to various embodiments, the application 134 may include a short message service (SMS)/media messaging service (MMS) application, an email application, a calendar application, an alarm application, a health care application (for example, an application that measures the amount of exercise or a blood sugar level), or an environment information application (for example, an application that provides information about air pressure, humidity, or temperature). Alternatively or additionally, the application 134 may be related to information exchange between the electronic device 101 and an external electronic device (for example, an electronic device 104). The information exchange-related application may be, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the electronic device 104). Alternatively or additionally, the notification relay application may receive notification information from the external electronic device (for example, the electronic device 104) and transmit the received notification information to a user. The device management application may manage (for example, install, delete, or update) at least a part of functions of the external electronic device (for example, the electronic device 104) communicating with the electronic device 101 (for example, turn-on/turn-off of the external electronic device (or a part of its components) or control of the brightness (or resolution) of the display), an application executed in the external electronic device, or a service (for example, a call service or a message service) provided by the external electronic device.

According to various embodiments, the application 134 may include an application designated according to a property (for example, the type of the electronic device) of the external electronic device (for example, the electronic device 104). For example, if the external electronic device is a digital audio player, the application 134 may include an application related to music play. If the external electronic device is a mobile medical device, the application 134 may include an application related to health care. According to an embodiment, the application 134 may include at least one of an application designated in the electronic device 101 or an application received from another electronic device (for example, a server 106 or the electronic device 104).

The I/O interface 140 may receive a command or data from a user through an I/O device (for example, a sensor, a keyboard, or a touch screen) to the processor 120, the memory 130, the communication interface 160, or the VR management module 170, for example, through the bus 110. For example, the I/O interface 140 may provide data of a user touch received through the touch screen to the processor 120. Further, the I/O interface 140 may, for example, output a command or data received from the processor 120, the memory 130, the communication interface 160, or the VR management module 170 through the bus 110 to the I/O device (for example, a speaker or a display). For example, the I/O interface 140 may output voice data processed by the processor 120 to a user through the speaker.

The display 150 may display various types of information (for example, multimedia data or text data) to the user.

The communication interface 160 may provide communication between the electronic device 101 and an external device (for example, the electronic device 104 or the server 106). For example, the communication interface 160 may be connected to a network 162 by wireless or wired communication and communicate with the external device over the network 162. The wireless communication may be conducted in conformance to, for example, at least one of wireless fidelity (WiFi), bluetooth (BT), near field communication (NFC), GPS, and cellular communication (for example, long term evolution (LTE), LTE-Advanced (LTE-A), code division multiple access (CDMA), Wideband CDMA (WCDMA), universal mobile telecommunication system (UMTS), wireless broadband (WiBro), or global system for mobile communications (GSM)). The wired communication may be conducted in conformance to, for example, at least one of universal serial bus (USB), high definition multimedia interface (HDMI), Recommended Standard 232 (RS-232), or plain old telephone service (POTS).

According to an embodiment, the network 162 may be a communication network, for example, at least one of a computer network, the Internet, an Internet of things (IoT), and a telephone network. According to an embodiment, at least one of the application 134, the API 133, the middleware 132, the kernel 131, or the communication interface 160 may support a protocol (for example, a transport layer protocol, a data link layer protocol, or a physical layer protocol) for communication between the electronic device 101 and an external device.

According to various embodiments of the present disclosure, the VR management module 170 may perform, for example, an operation for detecting a reference screen setting event with respect to a screen displayed in an electronic device, an operation for storing at least part of information related to the screen displayed in the electronic device in response to the detected reference screen setting event, an operation for detecting a reference screen display event, and an operation for displaying the reference screen in the electronic device based on the stored information in response to the reference screen display event.

A function(s) or operation(s) of the VR management module 170 may be implemented by, for example, the processor 120 according to various embodiments. A detailed description will be given of the VR management module 170 further below.

Figure 2:
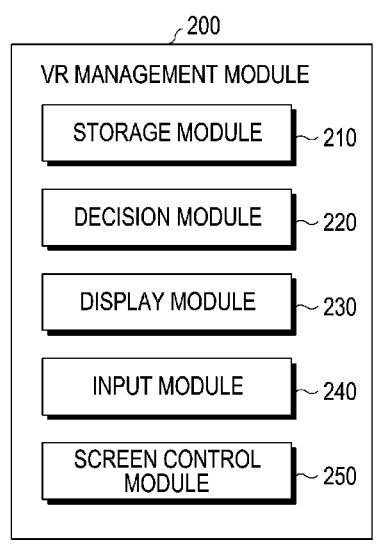
FIG. 2 is a block diagram of a virtual reality (VR) management module of an electronic device (for example, an electronic device 101) according to various embodiments of the present disclosure.

FIG. 2 is a block diagram of a VR management module 200 in an electronic device (for example, the electronic device 101) according to various embodiments of the present disclosure. The VR management module 200 may include a storage module 210, a decision module 220, a display module 230, an input module 240, and a screen control module 250.

According to various embodiments of the present disclosure, upon detecting occurrence of a reference screen setting event with respect to a screen displayed in the electronic device (for example, the electronic device 101), the storage module 210 may store information related to the displayed screen. The storage module 210 may store a command or data received from various components of the VR management module 200 or generated by the processor 120 or other components.

According to various embodiments of the present disclosure, upon detecting occurrence of a reference screen display event after the reference screen setting event is detected, the decision module 220 may determine a reference screen to be displayed in the electronic device based on the information related to the screen.

According to various embodiments of the present disclosure, the display module 230 may display various types of information (for example, multimedia data or text data) to be provided to the user. The display module 230 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display module 230 may be connected functionally to an element(s) of the electronic device. Also, the display module 230 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

Figure 9B:
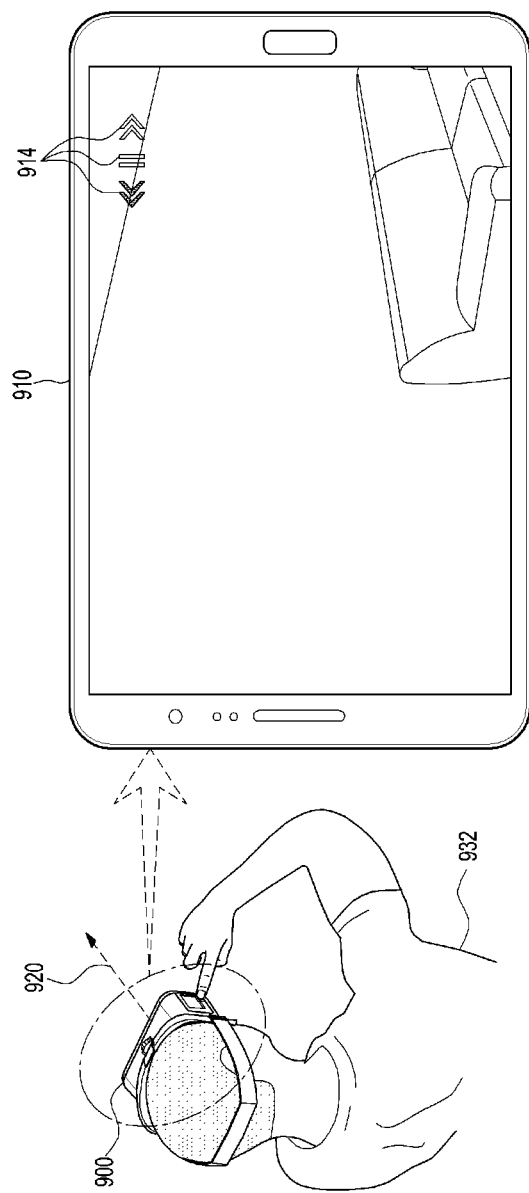
Figure 9C:
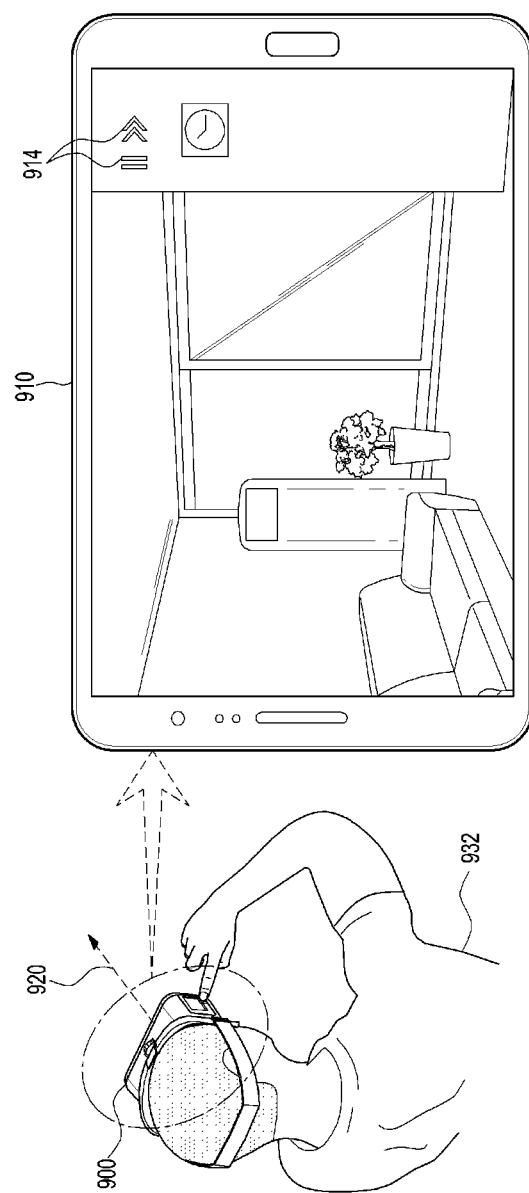

According to various embodiments of the present disclosure, the screen control module 250 may control an attribute of a screen displayed on the display module 230 according to an input received through the input module 240. For example, upon receipt of an input for changing the position of the reference screen, the screen control module 250 may control display of the reference screen at a changed position on the display module 230, as illustrated in FIGS. 9A, 9B, and 9C which will be described later.

Figure 3A:
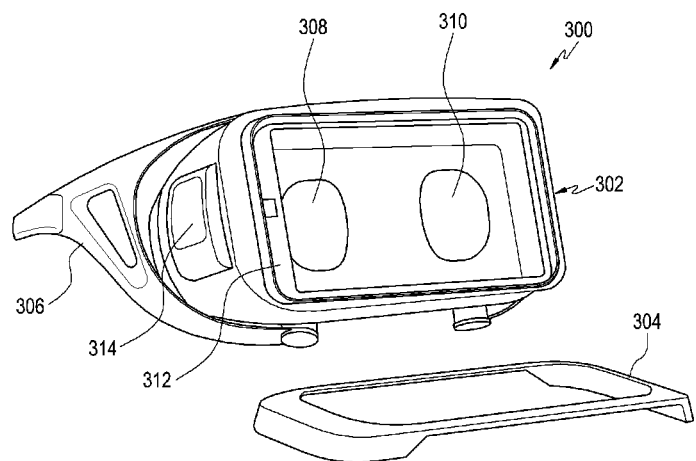
FIG. 3A is a view illustrating a head-mounted electronic device according to various embodiments of the present disclosure.

Referring to FIG. 3A, a head-mounted electronic device 300 according to various embodiments of the present disclosure may be, for example, the electronic device 104 illustrated in FIG. 1. The head-mounted electronic device 300 may include a body 302 and a cover 304. The body 302 may include a support 306, two lenses 308 and 310, a mounting unit 312, and a control device 314.

If the electronic device 101 is mounted to the head-mounted electronic device 300, the cover 304 may fix the electronic device 101 to the head-mounted electronic device 300, covering along the periphery of the rear surface of the head-mounted electronic device 300, so that the electronic device 101 may be kept mounted in the head-mounted electronic device 300. The support 306 may be a tool with which a user wears the head-mounted electronic device 300 on the user's head. The lenses 308 and 310 may be installed at positions corresponding to both eyes of the user. The user may view a screen on a display (not shown) through the lenses 308 and 310. The mounting unit 312 may be a mechanical structure of the head-mounted electronic device 300, in which the electronic device 101 illustrated in FIG. 1, for example, may be detachably mounted.

According to various embodiments of the present disclosure, the control device 314 may be installed on a side surface of the body 302. The control device 314 may be used for the user to enter an input for controlling the head-mounted electronic device 300. For example, the control device 314 may include at least one of a touch panel, a button, a wheel key, and a touch pad. The touch panel may receive the user's touch input. The touch input may be a direct touch input to the touch panel or a hovering input in the vicinity of the touch panel. The head-mounted electronic device 300 may be connected to the electronic device 101 via an interface such as a USB and transmit an input received from the control device 314 to the electronic device 101. The electronic device 101 may control a function corresponding to the input received through the control device 314 of the head-mounted electronic device 300 in response to the input. For example, the control device 314 may control a sound volume level or video play in response to a received input.

Figure 3B:
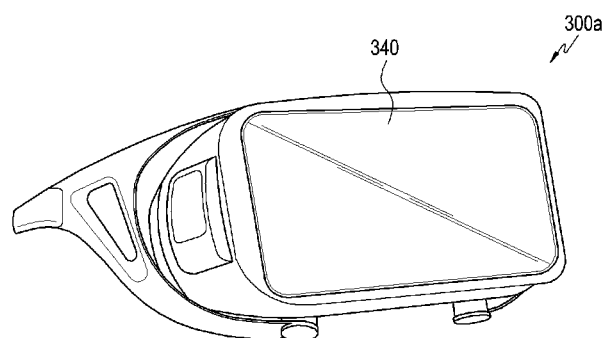
FIG. 3B is a view illustrating a head-mounted electronic device different from the head-mounted electronic device illustrated in FIG. 3A according to another embodiment of the present disclosure.
Figure 3C:
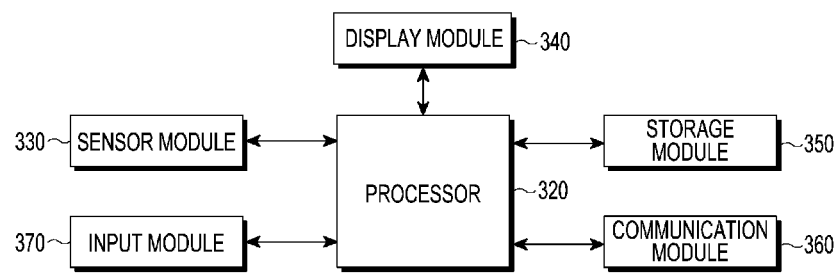
FIG. 3C is a block diagram of the head-mounted electronic device illustrated in FIG. 3B according to another embodiment of the present disclosure.

FIG. 3B is a view illustrating a head-mounted electronic device different from the head-mounted electronic device illustrated in FIG. 3A according to another embodiment of the present disclosure, and FIG. 3C is a block diagram of the head-mounted electronic device illustrated in FIG. 3B.

Referring to FIG. 3B, a head-mounted electronic device 300a may be, for example, the electronic device 101 illustrated in FIG. 1. That is, the head-mounted electronic device 300a according to another embodiment of the present disclosure may include a display module 340 and the display module 340 may be connected functionally to another element(s) of the head-mounted electronic device 300a. The head-mounted electronic device 300a may be configured not to allow another electronic device (for example, a first electronic device 400) to be mounted to the head-mounted electronic device 300a and thus may not include the mounting unit 312. The head-mounted electronic device 300a may further include, for example, a processor 320, a sensor module 330, a storage module 350, a communication module 360, and an input module 370. Various embodiments of the present disclosure described below may also apply to the head-mounted electronic device 300a. The sensor module 330 of the head-mounted electronic device 300a may measure a physical property or sense an operation state of the head-mounted electronic device 300a and convert the measured or sensed information to an electrical signal. The sensor module 330 may include at least one of, for example, an accelerometer, a gyro sensor, a geomagnetic sensor, a magnetic sensor, a proximity sensor, a gesture sensor, a grip sensor, a biometric sensor, and an access sensor. The sensor module 330 may acquire information for determining a motion of the user wearing the head-mounted electronic device 300a or whether the user wears or removes the head-mounted electronic device 300a, using at least one of the foregoing sensors. The processor 320 may include, for example, the processor 120. The processor 320 may control execution of a function(s) or an operation(s) corresponding to an input received through a control device (for example, the control device 314) in response to the received input. The display module 340 may include, for example, the display 150. The storage module 350 may include, for example, the memory 130. The communication module 360 may include, for example, the communication interface 160. The input module 370 may include the I/O interface 140. For other details of the head-mounted electronic device 300a illustrated in FIG. 3B, the description given with reference to FIG. 3A may be referred to.

Figure 4A:
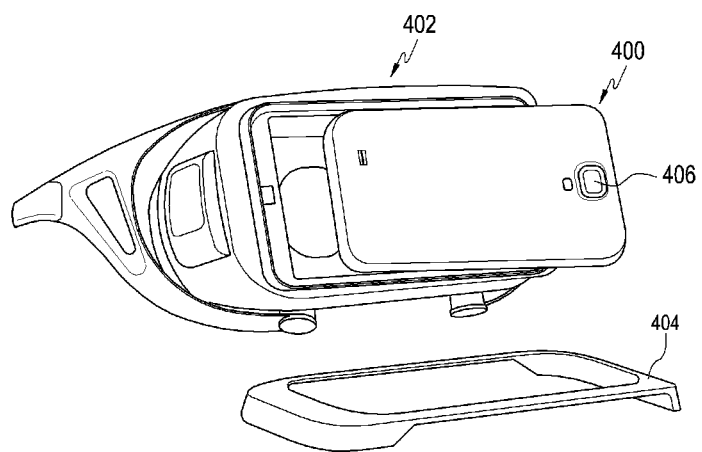
FIG. 4A is a view illustrating a first electronic device (for example, a portable terminal) mounted to a second electronic device (for example, a head-mounted electronic device) according to various embodiments of the present disclosure.
Figure 4B:
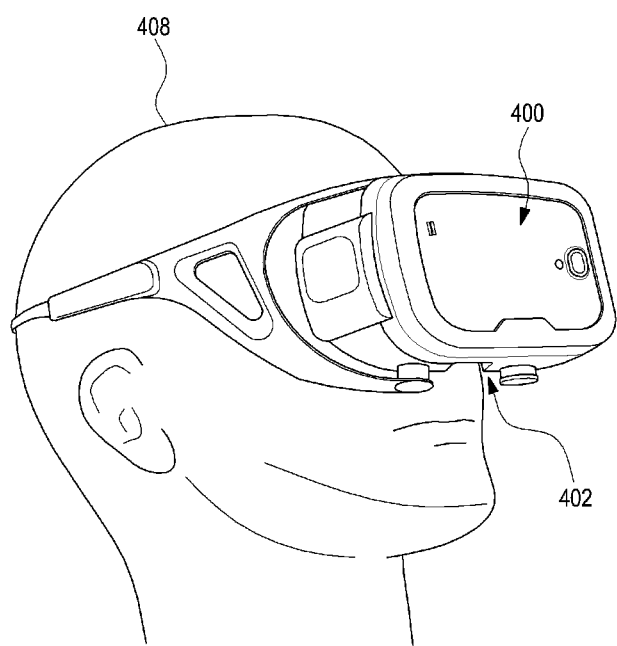
FIG. 4B is a view illustrating an example in which a user wears a second electronic device to which a first electronic device is mounted according to various embodiments of the present disclosure.

FIG. 4A illustrates an example in which the first electronic device 400 is mounted on a second electronic device 402 according to various embodiments of the present disclosure and FIG. 4B illustrates an example in which a user wears the second electronic device 402 with the first electronic device mounted on it according to various embodiments of the present disclosure.

Referring to FIGS. 4A and 4B, the first electronic device 400 may be the electronic device 101 illustrated in FIG. 1. For example, the first electronic device 400 may be a smartphone having a camera 406 installed on its rear surface. The second electronic device 402 may be the head-mounted electronic device 300 illustrated in FIG. 3A.

According to various embodiments of the present disclosure, the user may mount the first electronic device 400 in a mounting unit (for example, the mounting unit 312 illustrated in FIG. 3A) of the second electronic device 402 in such a manner that the front surface of the first electronic device 400 having a display (not shown) on it may face lenses (for example, the lenses 308 and 310 illustrated in FIG. 3A) of the second electronic device 402, as illustrated in FIG. 4A. The user may fix the first electronic device 400 to the second electronic device 402 by covering the first electronic device 400 with a cover 404. The user may wear the second electronic device 402 with the first electronic device 400 mounted on it around the user's head, as illustrated in FIG. 4B. FIG. 4B illustrates an example in which a user 408 wears the second electronic device 402 with the first electronic device 400 mounted on it around the head. The user 408 may view a screen on the display of the first electronic device 400 through the lenses (for example, the lenses 308 and 310 illustrated in FIG. 3) of the second electronic device 402.

Figure 5:
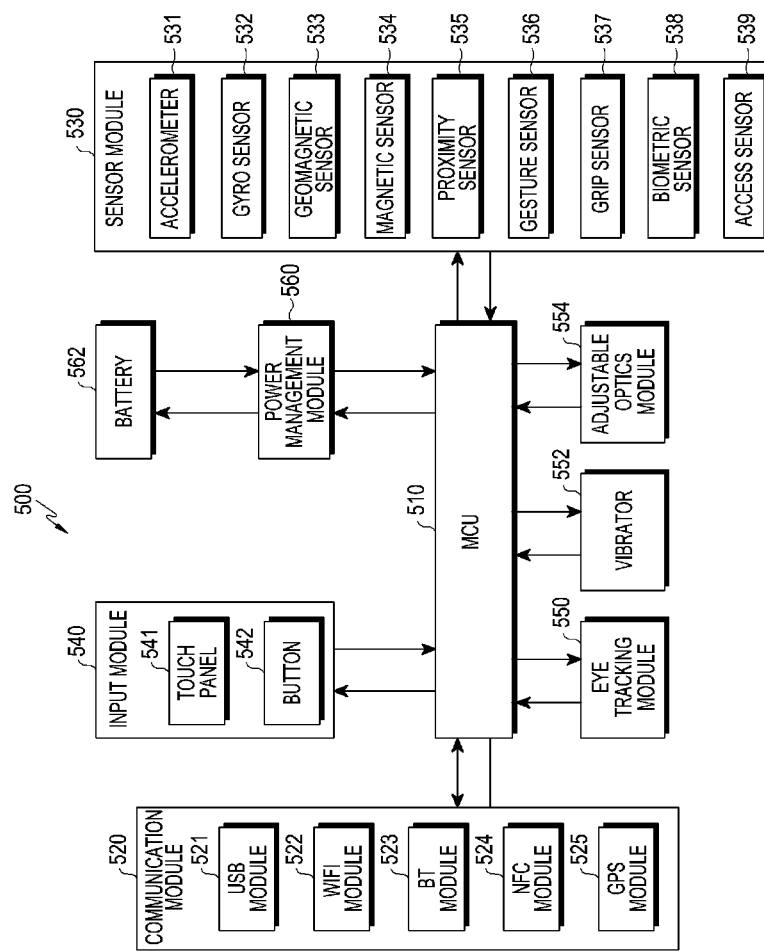
FIG. 5 is a block diagram of a second electronic device according to various embodiments of the present disclosure.

FIG. 5 is a block diagram of a second electronic device 500 according to various embodiments of the present disclosure.

Referring to FIG. 5, the second electronic device 500 may be the head-mounted electronic device 300 illustrated in FIG. 3A or the second electronic device 402 illustrated in FIGS. 4A and 4B. The second electronic device 500 may include at least one of a micro controller unit (MCU) 510, a communication module 520, a sensor module 530, an input module 540, an eye tracking module 550, a vibrator 552, an adjustable optics module 554, a power management module 560, and a battery 562.

The MCU 510 may be a controller of the second electronic device 500, for controlling other components (for example, the communication module 520, the sensor module 530, the input module 540, the eye tracking module 550, the vibrator 552, the adjustable optics module 554, and the power management module 560) by driving an operating system (OS) or an embedded software program. The MCU 510 may include a processor and a memory.

The communication module 520 may electrically connect the first electronic device (for example, the first electronic device 400) to the second electronic device 500 by wired or wireless communication and perform data transmission and reception between the electronic devices. According to an embodiment, the communication module 520 may include a USB module 521, a WiFi module 522, a BT module 523, an NFC module 524, and a GPS module 525. According to an embodiment, at least three of the USB module 521, the WiFi module 522, the BT module 523, the NFC module 524, and the GPS module 525 may be included in a single integrated chip (IC) or IC package.

The sensor module 530 may measure a physical property or sense an operation state of the second electronic device 500 and convert the measured or sensed information to an electrical signal. The sensor module 530 may include at least one of, for example, an accelerometer 531, a gyro sensor 532, a geomagnetic sensor 533, a magnetic sensor 534, a proximity sensor 535, a gesture sensor 536, a grip sensor 537, a biometric sensor 538, and an access sensor 539. The second electronic device 500 may sense a head motion of the user wearing the second electronic device 500, using at least one of the accelerometer 531, the gyro sensor 532, and the geomagnetic sensor 533. The second electronic device 500 may sense whether the second electronic device 500 is worn or removed, using the proximity sensor 535 or the grip sensor 537. According to an embodiment, the second electronic device 500 may determine whether the user wears the second electronic device 500 by at least one of infraRed (IR) recognition, pressure recognition, and sensing of a capacitance (or dielectric constant) variation involved in wearing of the second electronic device 500. The gesture sensor 536 may sense a hand or finger motion of the user and receive the hand or finger motion as an input to the second electronic device 500. The second electronic device 500 may sense proximity of an object to the user by the proximity sensor 535. Alternatively or additionally, the sensor module 530 may include a biometric sensor such as an e-node sensor, an electroMyoGraphy (EMG) sensor, an electroEncephaloGram (EEG) sensor, an electroCardioGram (ECG) sensor, an iris sensor, and a finger print sensor and thus may recognize vital information about the user. The sensor module 530 may further include a control circuit for controlling at least one of internal sensors.

The input module 540 may be the control device 314 illustrated in FIG. 3A. The input module 540 may receive an input from the user. The input module 540 may include a touch pad 541 and a button 542. The touch pad 541 may recognize a touch input in at least one of a capacitive manner, a resistive manner, an IR manner, and an ultrasonic manner. The touch pad 541 may further include a control circuit. If the touch pad 541 operates in the capacitive manner, the touch pad 541 may recognize a physical contact or proximity. The touch pad 541 may further include a tactile layer. In this case, the touch pad 541 may provide a tactile response to the user. The button 542 may be, for example, a physical button, an optical key, or a keypad.

The power management module 560 may manage power of the second electronic device 500. While not shown, the power management module 560 may include, for example, a power management integrated circuit (PMIC), a charger IC, or a battery fuel gauge.

The PMIC may be mounted, for example, on an IC or a system on a chip (SOC) semiconductor. A battery may be charged wiredly or wirelessly. The charger IC may charge the battery and prevent introduction of overvoltage or overcurrent from a charger. According to an embodiment, the charger IC may operate wiredly and/or wirelessly. Wireless charging may be performed, for example, by magnetic resonance, magnetic induction, or electromagnetic waves. A circuit for wireless charging, for example, a coil loop, a resonance circuit, or a rectifier may be added.

The battery fuel gauge may measure, for example, a charge level, a voltage while charging, a current, or temperature of the battery 562. The battery 562 may store electricity and supply power. The battery 562 may include a rechargeable battery or a solar battery.

The eye tracking module 550 may track the eyes of the user by at least one of an electrical ocular graph (EOG) sensor, a coil system, a dual purkinje system, a bright pupil system, and a dark pupil system. Further, the eye tracking module 550 may include a micro camera for tracking the eyes.

The adjustable optics module 554 may measure an interpupil distance (IPD) of the user so that the user may view an image suitable for the user's sight. The second electronic device 500 may adjust the distance between lenses according to the IPD of the user measured by the adjustable optics module 554. The second electronic device 500 may transmit the IPD of the user measured by the adjustable optics module 554 to the first electronic device so as to adjust a displayed position of a screen on the display of the first electronic device.

The MCU 510 may transmit a motion signal sensed through the motion sensor of the sensor module 530 and transmit the motion signal to the first electronic device. The motion sensor may be at least one of the accelerometer 531, the gyro sensor 532, and the geomagnetic sensor 533.

The MCU 510 may sense access of an object to the user of the second electronic device 500 through the access sensor 539 and transmit an access sensing signal to the first electronic device. The MCU 510 may measure a direction from which the object accesses the user of the second electronic device 500 through the access sensor 539 and transmit information indicating the direction to the first electronic device.

The access sensor 539 may be a space recognition sensor such as an IR sensor, an ultrasonic sensor, a radio frequency (RF) sensor, or a radar. A Wisee sensor or an Allsee sensor may be used as the RF sensor. According to an embodiment, a wireless communication module may be used as the access sensor 539. The wireless communication module may be at least one of the WiFi module 522, the BT module 523, the NFC module 524, and the GPS module 525. When an object accesses the second electronic device, the received signal strength of a wireless communication signal received at the wireless communication module may get weak. If the received signal strength is fast dropped by a value larger than a predetermined threshold while the user of the second electronic device is stationary, the MCU 510 may determine that the object is accessing. Also, the MCU 510 may determine a direction in which the received signal strength is fast dropped by the value larger than the predetermined threshold to be a direction from which the object is accessing.

Figure 6A:
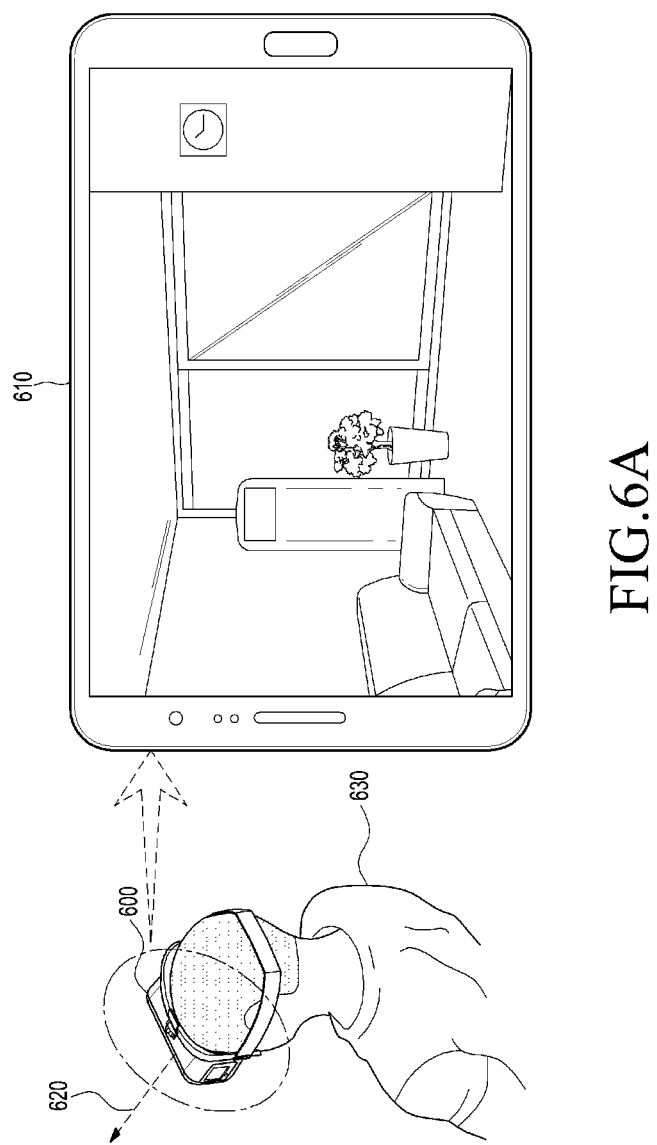
FIGS. 6A, 6B, and 6C are views illustrating an operation for, when a first electronic device according to various embodiments of the present disclosure is removed and then re-worn, displaying the same screen displayed at the moment of the removal on the first electronic device after the wearing.
Figure 6B:
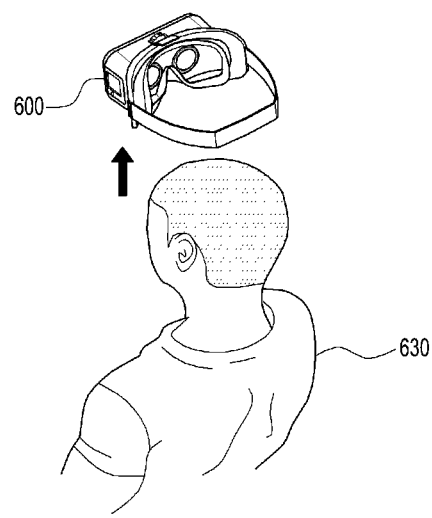
Figure 6C:
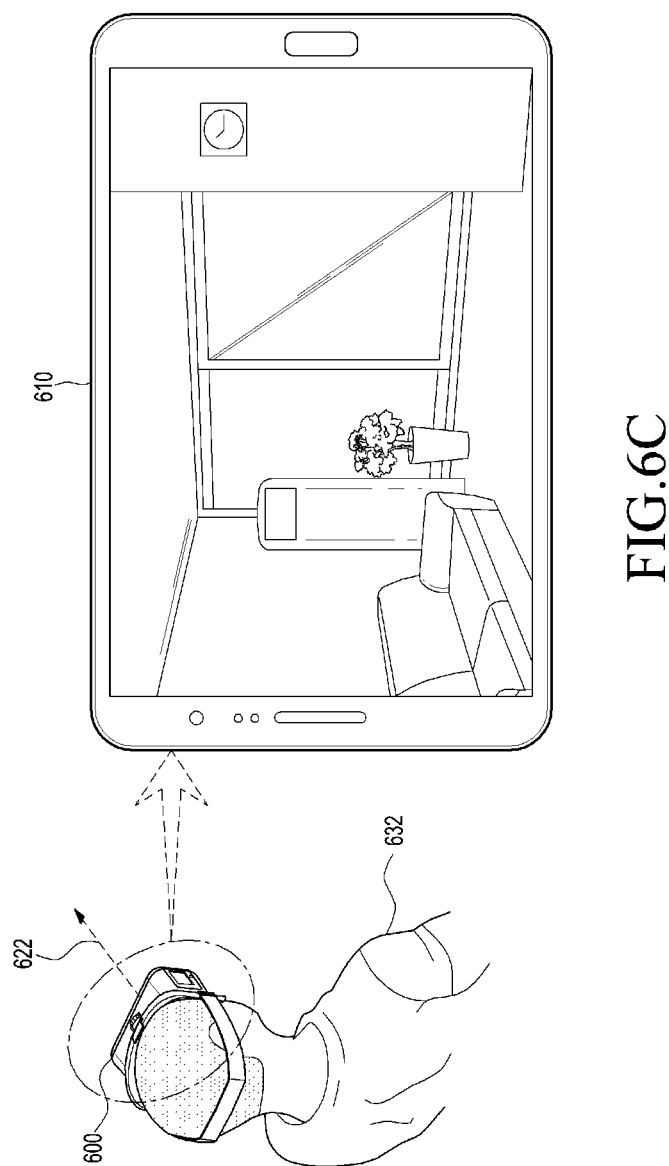

FIGS. 6A, 6B, and 6C are views illustrating an operation for, when a first electronic device according to various embodiments of the present disclosure is removed and then re-worn, displaying the same screen as displayed at the moment of the removal in the first electronic device after the wearing of the other user.

Referring to FIG. 6A, a second electronic device 600 with a first electronic device 610 mounted on it may be positioned in a first direction 620, while the second electronic device 600 is worn on a body part (for example, the head) of a first user 630.

A screen for providing a VR to a user (for example, the first user 630) may be displayed on the display module of the first electronic device 610, as illustrated in FIG. 6A. The first user 630 may remove the second electronic device 600 to show the screen (for example, the screen illustrated in FIG. 6A) that the first user 630 was viewing to another user (for example, a second user 632), as illustrated in FIG. 6B. A processor (for example, the processor 120) of the first electronic device 610 may determine the action of removing the second electronic device 600 from the first user 630 to be occurrence of a reference screen setting event. The processor may store information related to the screen displayed at the moment of removing the second electronic device 600 in a storage module (for example, the memory 130) in response to the reference screen setting event. According to various embodiments of the present disclosure, the information related to the screen may include at least one of information about the contents, coordinates, viewing angle, brightness, size, displayed position, and sound of the screen displayed on the display module (for example, the display 150) of the first electronic device 610 at the moment of removing the second electronic device 600 from the first user 630, and information related to the contents of a screen displayed on the display module according to the eye direction of the first user 630 before the second electronic device 600 is removed from the first user 630.

Referring to FIG. 6C, the second electronic device 600 may be removed from the body part of the first user 630, and then worn on the second user 632 directed in a second direction 622 different from the first direction 620. According to various embodiments of the present disclosure, a reference screen display event may include wearing of the second electronic device 600 by the second user 632. The reference screen may be a screen provided to the second user 632 based on the stored information about the screen. "removal" or "wearing" may be sensed by various sensors included in the second electronic device 600. According to various embodiments of the present disclosure, for example, the first electronic device 610 may perform a function(s) or an operation(s) of the sensor module. In this case, the sensor module may be provided in the first electronic device 610.

According to various embodiments of the present disclosure, when the second user 632 wears the second electronic device 600 with the first electronic device 610 mounted on it, the processor may determine a reference screen based on the stored screen information and control display of the reference screen on the display module of the first electronic device 610.

According to various embodiments of the present disclosure, upon sensing removal of the second electronic device 600 from a body part of the first user 630, the processor may control a sensor (for example, the gyro sensor 432) not to move coordinates. That is, the processor may control the storage module to store the coordinates of the screen that was displayed on the display module at the moment of sensing the removal of the second electronic device 600 from the body part of the first user 630.

The second user 632 may view the same screen the first user 630 was viewing on the first electronic device 610, without a screen movement caused by a change in an eye direction by the operation illustrated in FIGS. 6A, 6B, and 6C. While it has been described with reference to FIGS. 6A, 6B, and 6C by way of example that the second user 632 other than the first user 630 wears the second electronic device 600, which should not be construed as limiting the present disclosure, the same thing may apply to the case where the first user 630 re-wears the second electronic device 600. Further, the reference screen display event may include, for example, an action of wearing the second electronic device 600 by the second user 632.

Figure 7A:
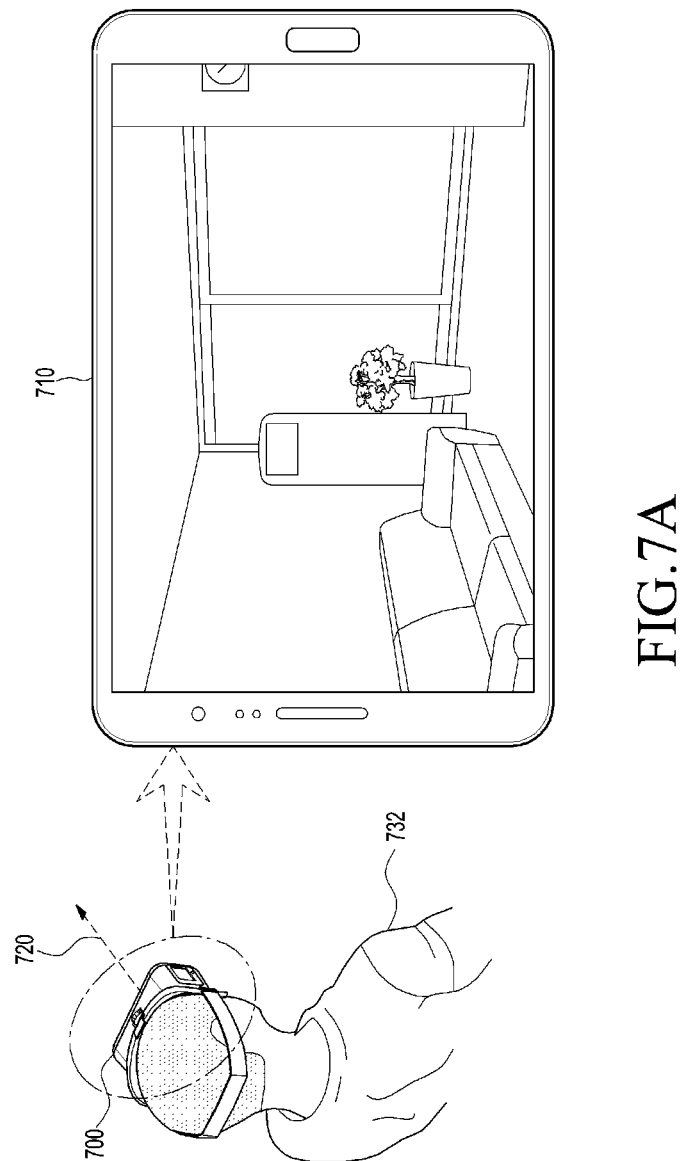
FIGS. 7A and 7B are views illustrating an operation for, when a first electronic device according to various embodiments of the present disclosure is removed and then re-worn, displaying a screen shifted from a screen that was displayed at the moment of the removal by a predetermined range on the first electronic device after the wearing.
Figure 7B:
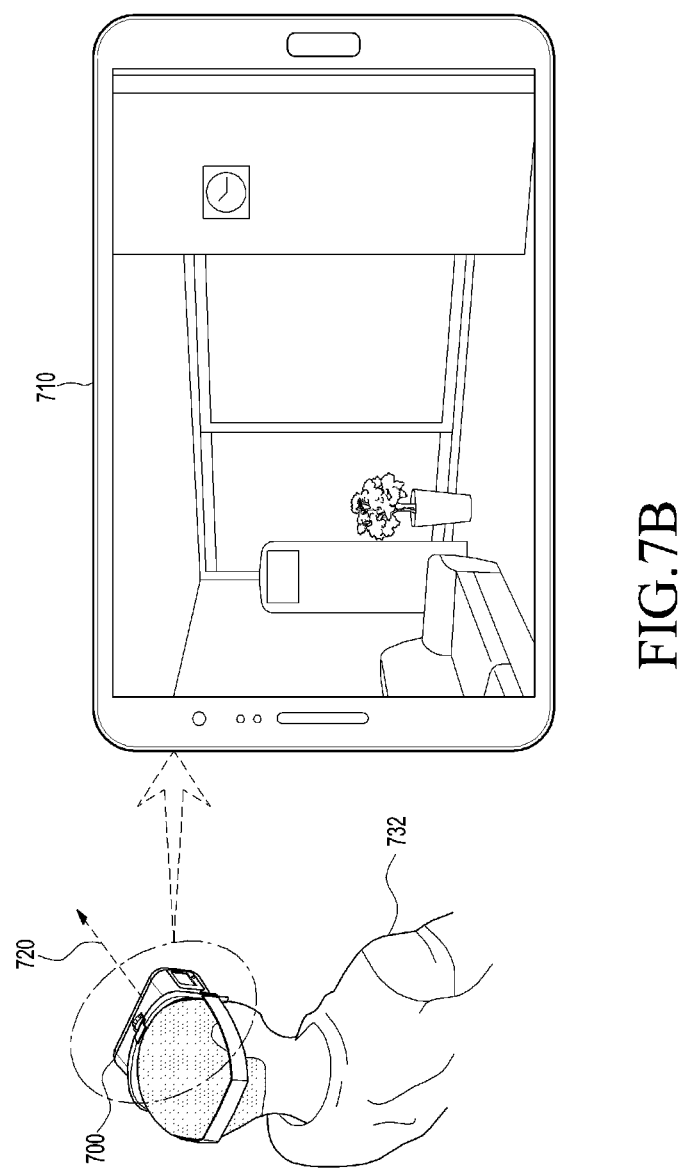

FIGS. 7A and 7B are views illustrating an operation for, when a first electronic device is removed from a user and then re-worn, displaying a screen displayed at the moment of the removal at a position shifted from the original position of the screen by a predetermined range according to various embodiments of the present disclosure.

Referring to FIGS. 7A and 7B, a screen displayed when a second user 732 wears a second electronic device 700 directed in a direction 720 may include a screen viewed at a changed viewing angle according to a determined angle with respect to a screen which has been displayed on a first electronic device 710 at the moment when the second electronic device 700 is removed from the second user 732. In this regard, a processor (for example, the processor 120) of the first electronic device 710 may control a storage module (for example, the memory 130) to store various information such as information about the contents, viewing angle, and/or coordinates of the screen displayed on the first electronic device 710. The processor may control display of a reference screen by changing the viewing angle of the screen according to a determined angle based on the stored information.

FIGS. 8A to 8D are views illustrating an operation for, when a first electronic device is removed from a user and then re-worn, displaying a screen which was displayed according to the eye direction of the user before the removal, along with a predetermined guide according to various embodiments of the present disclosure.

Referring to FIGS. 8A to 8D, a screen displayed on a first electronic device 810 may include a screen that was displayed on the first electronic device 810 according to an eye movement of a first user (for example, the first user 630) with respect to the moment of removing a second electronic device 800 directed in a direction 820 by the first user. For this purpose, a processor (for example, the processor 120) of the first electronic device 810 may control a storage module (for example, the memory 130) to store information about the contents of the screen displayed on a display module according to the eye movement of the first user 630 before the removal by the first user 630.

Figure 8A:
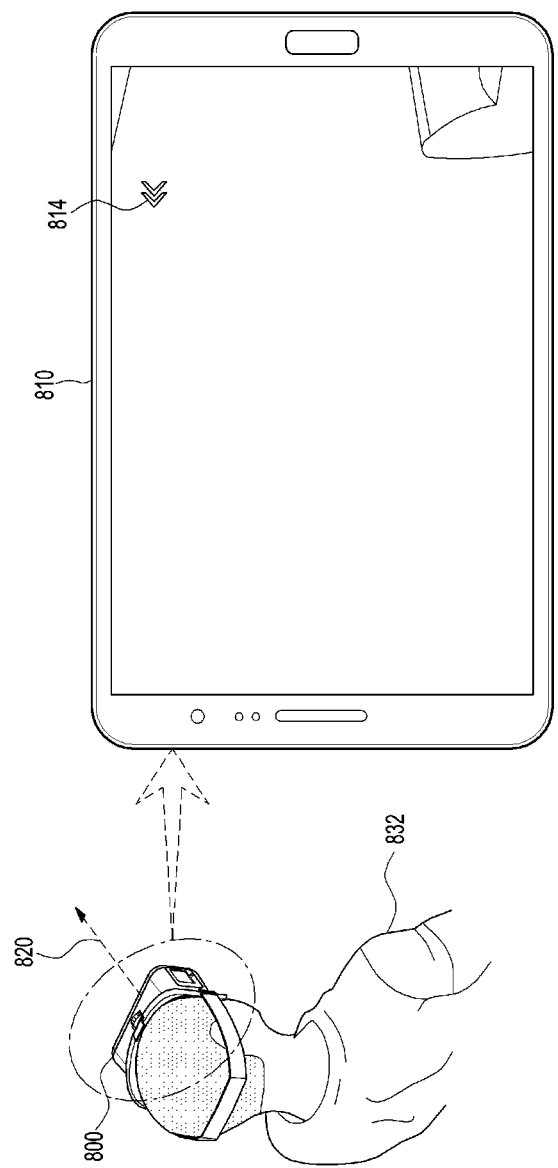
FIGS. 8A, 8B, 8C, and 8D are views illustrating an operation for, when a first electronic device according to various embodiments of the present disclosure is removed and then re-worn, displaying a screen that was displayed according to a view point of the user at the moment of the removal, along with a predetermined guide on the first electronic device after the wearing.
Figure 8B:
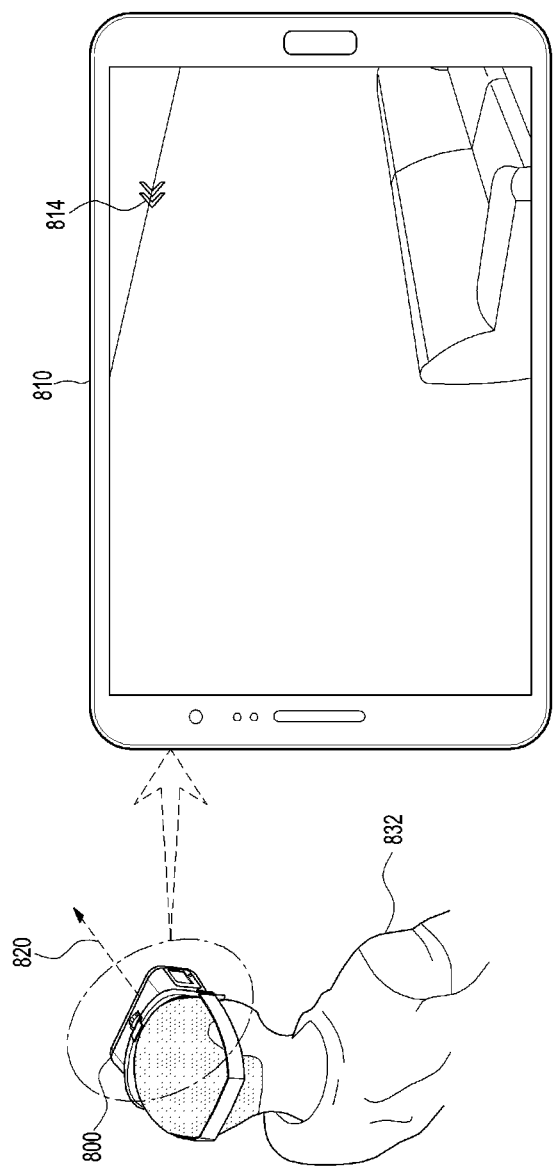
Figure 8C:
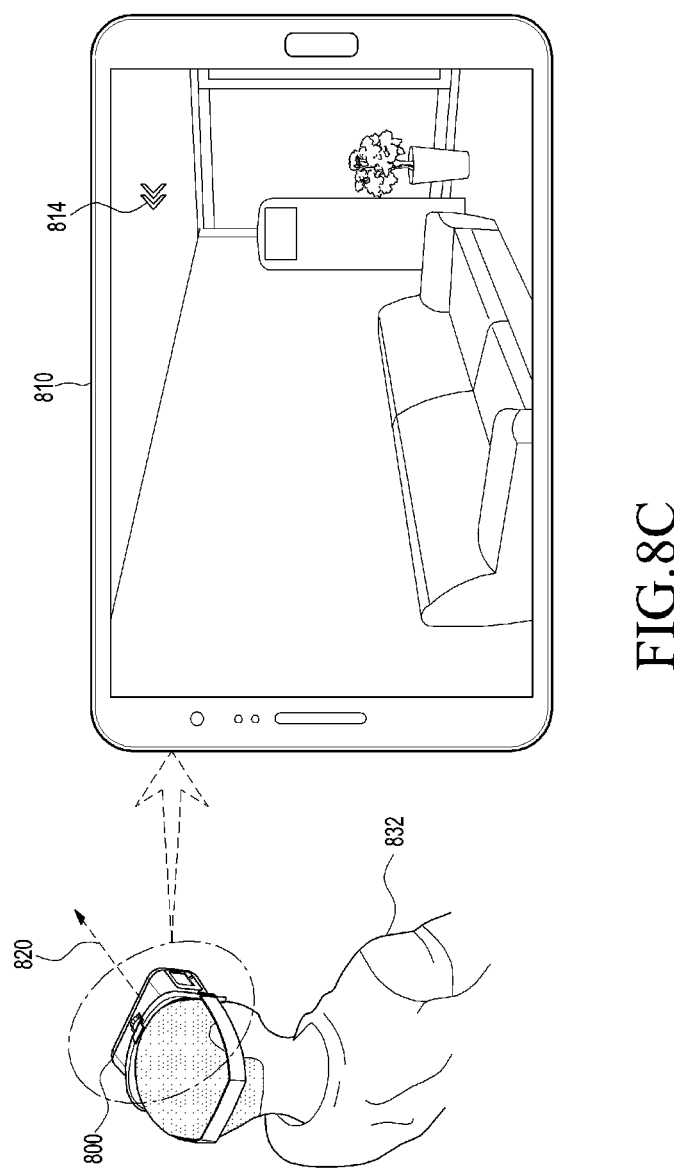
Figure 8D:
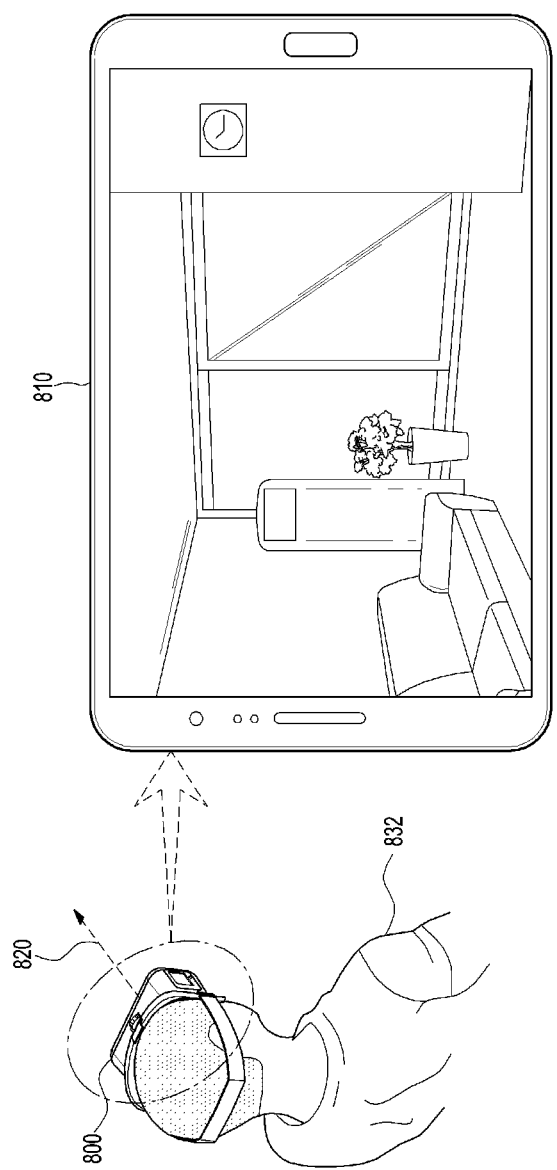

In FIGS. 8A to 8D, a screen (referred to as a history screen) that has been displayed according to an eye movement of the first user for a predetermined time (for example, 5 seconds) before a reference screen provided to the second user, may be displayed. The history screen may be a divided still image, a panorama view, or a video, which may be displayed on the first electronic device 810. A screen guide 814 may also be displayed along with the history screen on a display module (for example, the display 150) of the first electronic device 810. The screen guide 814 may indicate a screen proceeding (or movement) direction. A second user 832 may determine the direction in which the history screen proceeds or moves by the screen guide 814. However, it is to be understood that the screen guide 814 illustrated in FIGS. 8A, 8B, and 8C is a mere example given for illustrative purposes. The screen guide 814 may be provided to the second user 832 through an auditory interface (for example, a sound output from an output module) or a tactile interface (for example, vibrations of the electronic device) as well as a visual interface (for example, an icon displayed on a screen) as illustrated in FIGS. 8A, 8B, and 8C. As illustrated in FIG. 8D, if the history screen is entirely displayed, the screen guide 814 may not be displayed any longer. Upon sensing an eye movement of the second user 832 by a predetermined angle or larger during the display of the history screen, the processor may terminate displaying the history screen and control display of a screen matching the eye movement of the second user 832.

According to the embodiment illustrated in FIGS. 8A to 8D, a history screen automatically proceeds (or moves) and then is displayed as moved. That is, the history screen is played back without a request of a user for viewing another part of the history screen hidden due to a limited size of the display module.

While it has been described above in FIGS. 8A to 8D that the moment of removing the second electronic device from the first user is an end time of the history screen, this is exemplary. According to various embodiments of the present disclosure, a time point before the moment of removing the second electronic device 800 directed in a direction 820 from the first user may be set as the end time of the history screen. Also, any of various time points before the removal of the second electronic device from the first user may be set as a start time of the history screen.

FIGS. 9A, 9B, and 9C are views illustrating an operation for, when a first electronic device is removed from a user and then re-worn, controlling a screen displayed according to an eye direction of the user before the removal according to various embodiments of the present disclosure.

Referring to FIGS. 9A, 9B, and 9C, for example, a screen shift request may be received from a second user 932 directed in a direction 920 that wants to view a history screen. For example, the screen shift request may be received through an input module (for example, the input module 540) of a second electronic device 900. Or the screen shift request may be received through a first electronic device 910 according to various embodiments of the present disclosure. As described before with reference to FIGS. 8A to 8D, a screen guide 914 may be displayed on the first electronic device 910. Upon receipt of the screen shift request, a processor (for example, the processor 120) may control display of a screen shift direction by the screen guide 914, as illustrated in FIG. 9B. When the end time of the history screen is reached, the screen guide 914 indicating the screen shift direction is no longer displayed, to thereby indicate implicitly that the screen cannot move further to the second user 932. However, this is exemplary and it may be indicated to the second user 932 that the history screen cannot be moved further, through an auditory interface or a tactile interface.

Figure 10A:
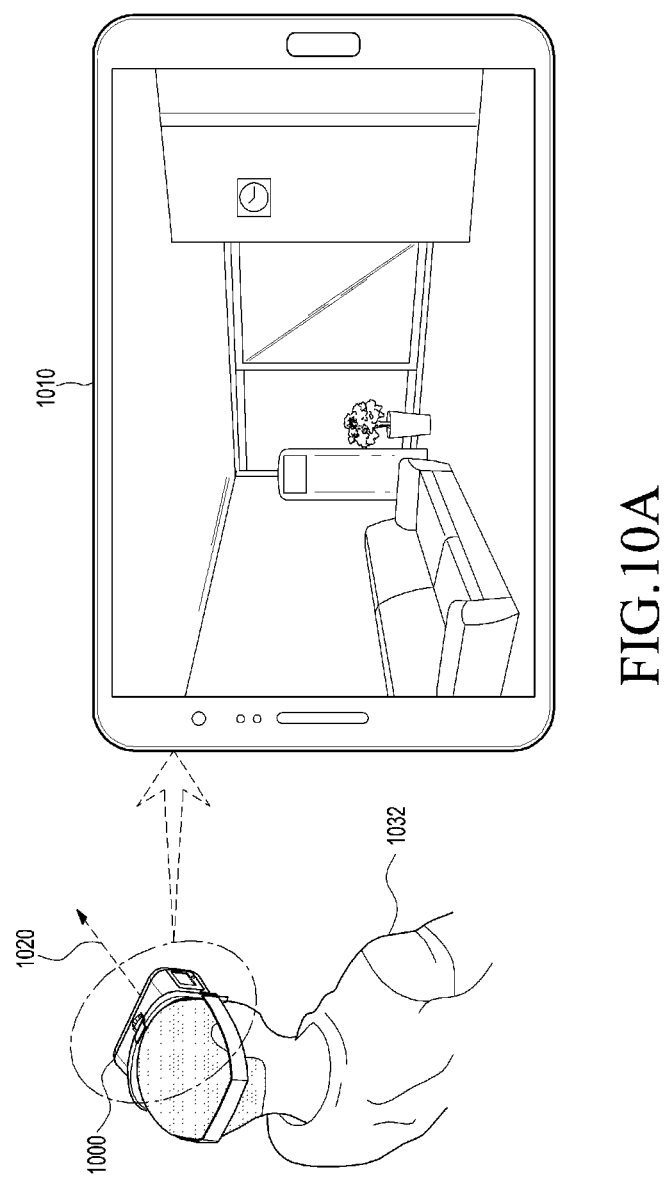
FIGS. 10A and 10B are views illustrating an operation for, when a first electronic device according to various embodiments of the present disclosure is removed and then worn, displaying an enlarged or contracted version of a screen that was displayed at the moment of the removal.
Figure 10B:
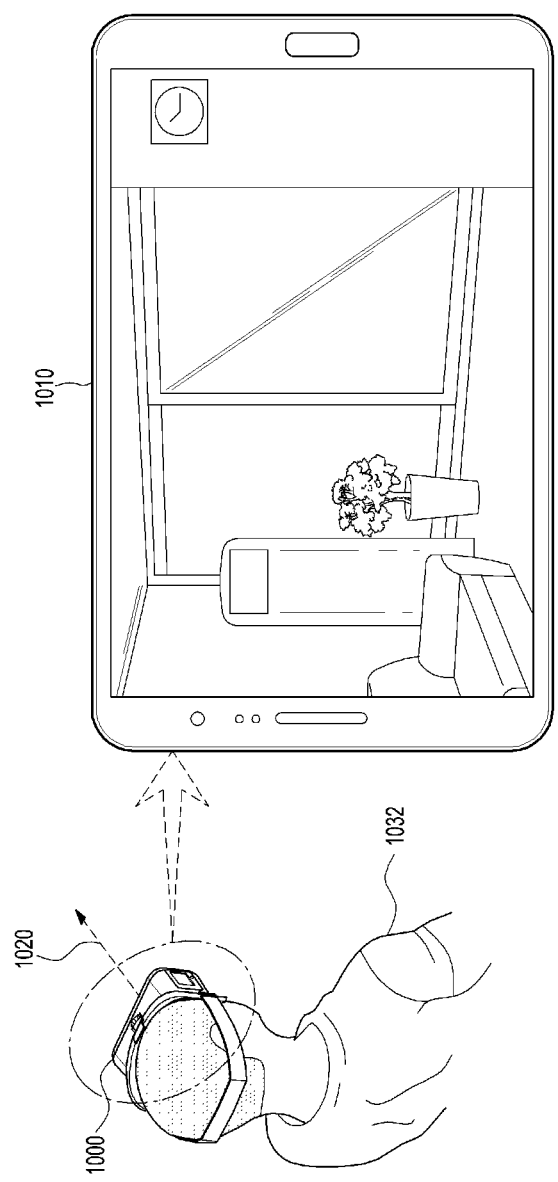

FIGS. 10A and 10B are views illustrating an operation for, when a first electronic device is removed from a user and then re-worn, displaying a screen having a size changed at a predetermined rate based on a screen displayed at the moment of the removal according to various embodiments of the present disclosure.

Referring to FIGS. 10A and 10B, a processor (for example, the processor 120) of a first electronic device 1010 may scale down or up a screen displayed at the moment of removing the first electronic device 1010 from a first user (for example, the first user 630) at a predetermined rate and may control display of the scaled-down or scaled-up screen as a reference screen on a display module (for example, the display 150) of the first electronic device 1010. The display of the scaled-down or scaled-up screen may be controlled based on a request from second user 1032 directed in a direction 1020 via a second electronic device 1000.

Figure 11A:
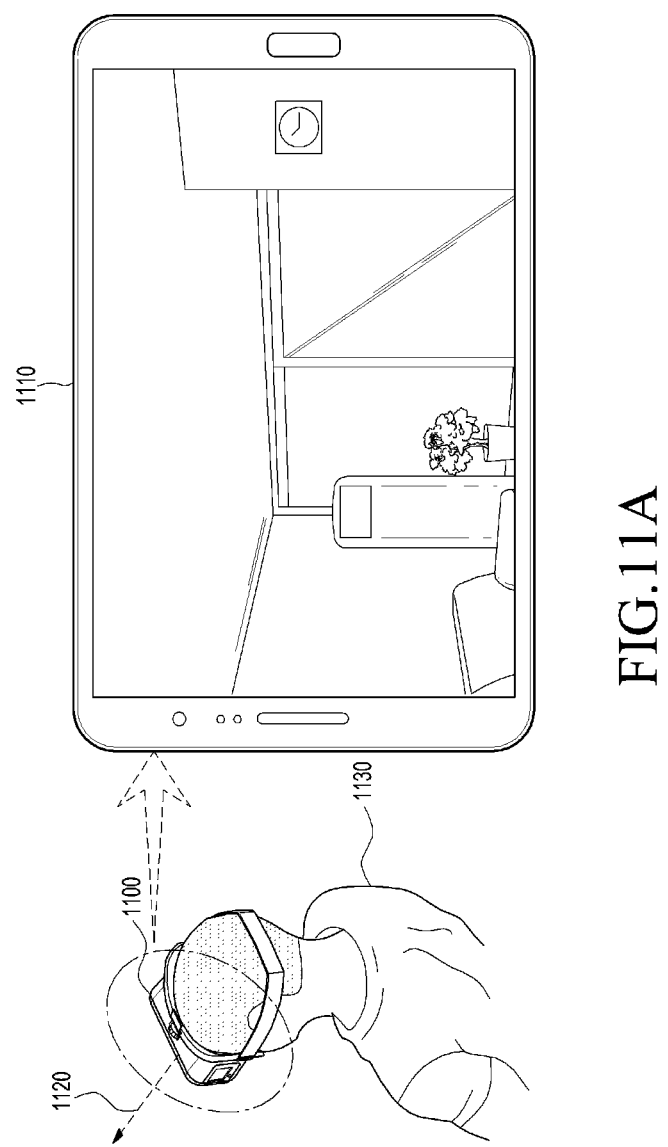
FIGS. 11A, 11B, and 11C are views illustrating an operation for, when a first electronic device according to various embodiments of the present disclosure is removed and then worn, displaying a screen with a view point shifted to the center of an object.
Figure 11B:
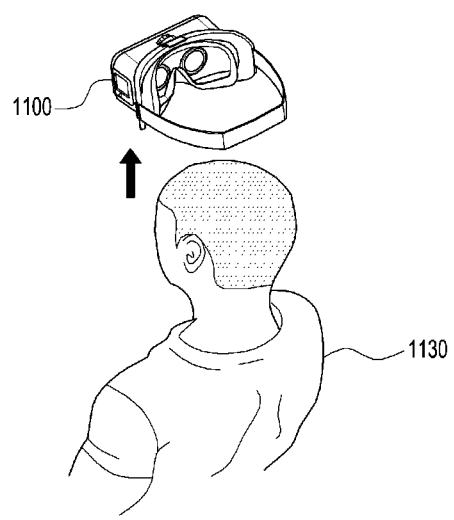
Figure 11C:
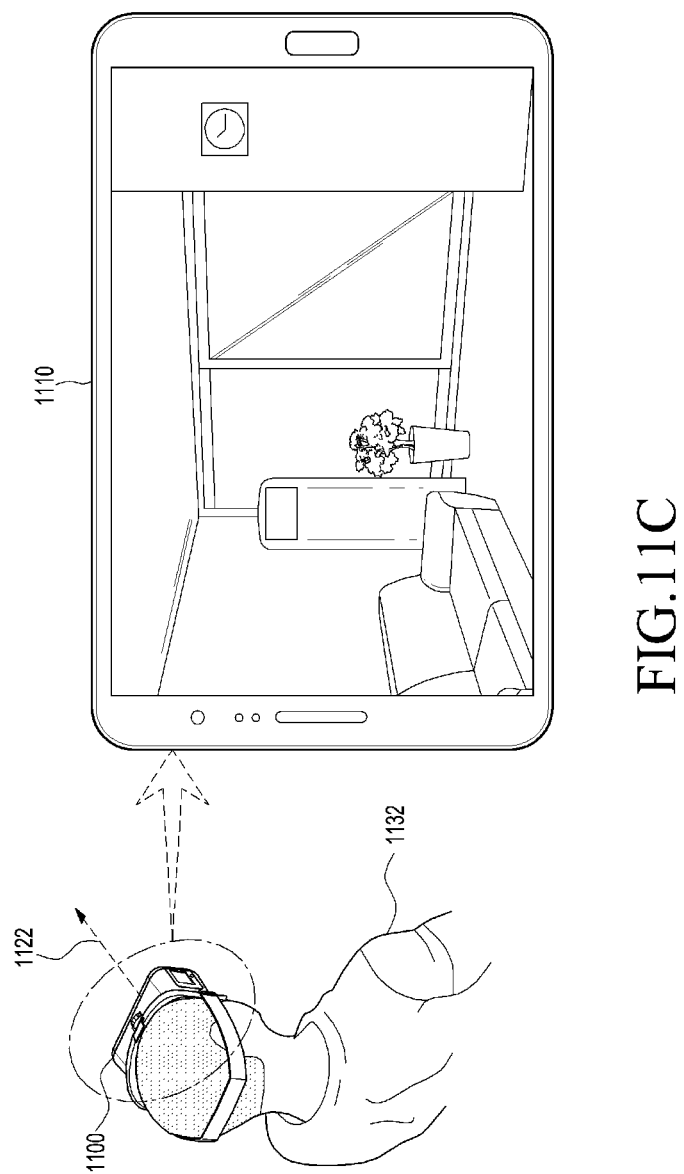

FIGS. 11A, 11B, and 11C are views illustrating an operation for, when a first electronic device is removed from a user and then re-worn, displaying a screen having a view point shifted to the center of an object according to various embodiments of the present disclosure.

Referring to FIGS. 11A, 11B, and 11C, when a first electronic device 1110 is removed from a first user 1130 directed in a first direction 1120, the eyes of the first user 1130 are not directed to the center of a specific object. Thus, the specific object may be displayed as illustrated in FIG. 11A. Upon detecting of occurrence of a reference screen display event (for example, when a second user 1132 directed in a second direction 1122 wears a second electronic device 1100), a processor (for example, the processor 120) of the first electronic device 1110 may control display of a screen based on the center of the object. Accordingly, the second user 1132 may view the screen displayed based on the center of the specific object.

FIGS. 12A to 12E are views illustrating an operation for displaying a reference screen based on a screen displayed on a first electronic device at a time point when a user wears the first electronic device according to various embodiments of the present disclosure.

Figure 12A:
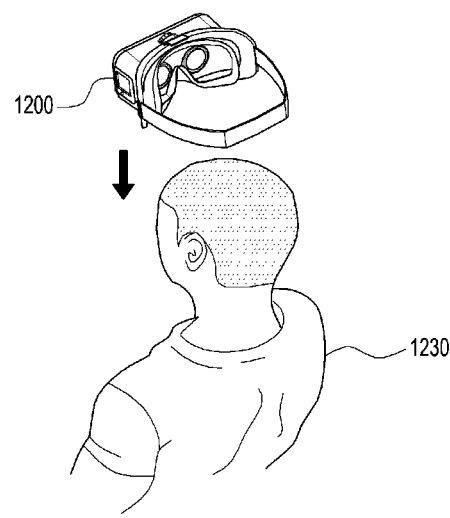
FIGS. 12A, 12B, 12C, 12D, and 12E are views illustrating an operation for displaying a reference screen based on a screen displayed on a first electronic device according to various embodiments of the present disclosure at a time point when a user wears the first electronic device.
Figure 12B:
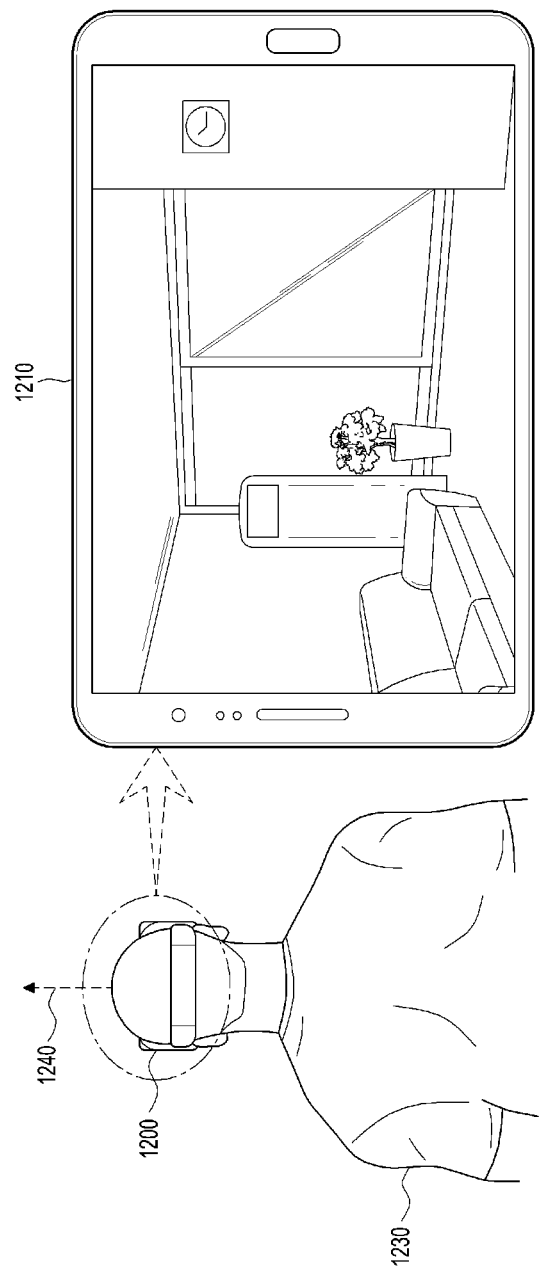
Figure 12C:
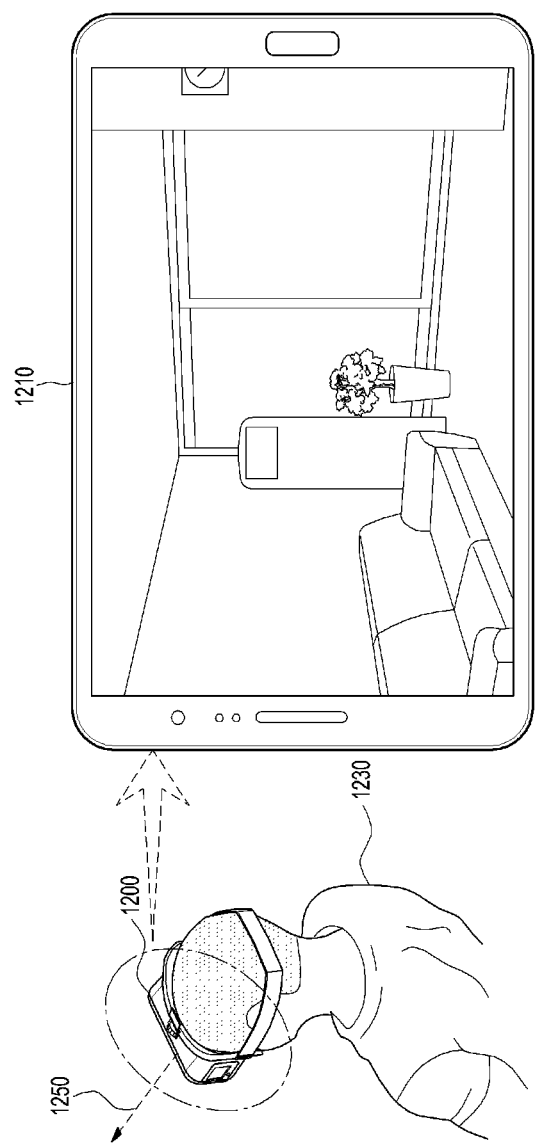
Figure 12D:
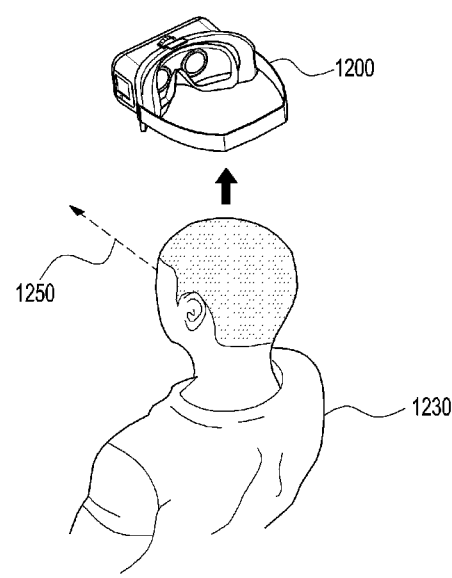
Figure 12E:
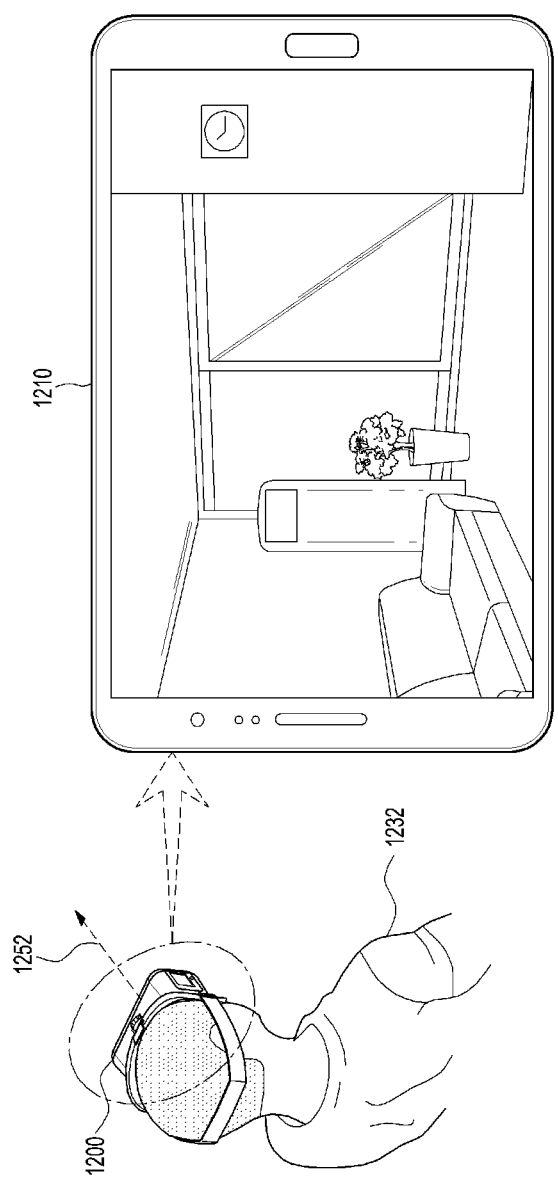

According to various embodiments of the present disclosure, after a processor (for example, the processor 120) of a first electronic device 1210 senses wearing of the first electronic device 1210 on a first user 1230, the processor may control a storage module (for example, the memory 130) to store information about an initial screen displayed on the first electronic device 1210 directed in a direction 1240. That is, compared to the foregoing embodiments, a reference screen setting event may be an action of wearing the head-mounted electronic device on the user. As illustrated in FIG. 12C, the processor may display a screen different from a screen matching a first direction 1250 according to a change in the eye direction of the first user 1230. Referring to FIG. 12D, the first user may remove a second electronic device 1200. Then, a second user 1332 may wear the second electronic device 1200 matching a first direction 1240, as illustrated in FIG. 12E. When the second user 1232 wears the second electronic device 1200 directed in a second direction 1252, the processor may determine that the wearing action has triggered a reference screen display event. Accordingly, the processor may control the same screen as the initial screen as a reference screen on the first electronic device 1210, as illustrated in FIG. 12E.

The description given with reference to FIGS. 6A to 11C may apply to a case in which a reference screen is displayed according to the embodiments illustrated in FIGS. 12A to 12E.

Figure 13A:
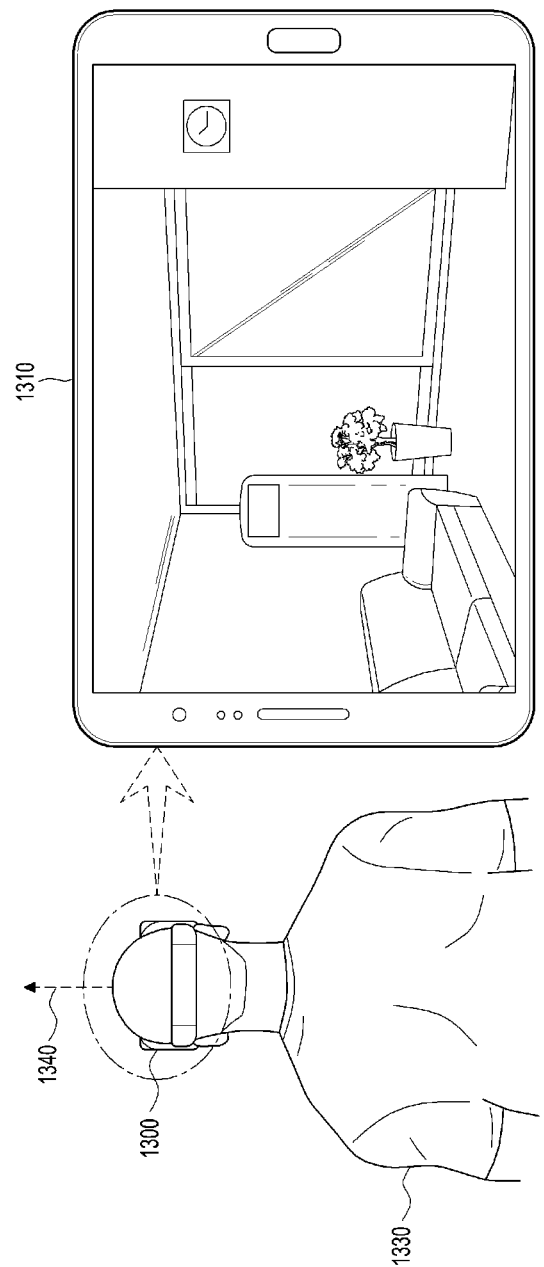
FIGS. 13A, 13B, and 13C are views illustrating an operation for storing screen information to determine a reference screen through a user input to a second electronic device according to various embodiments of the present disclosure.
Figure 13B:
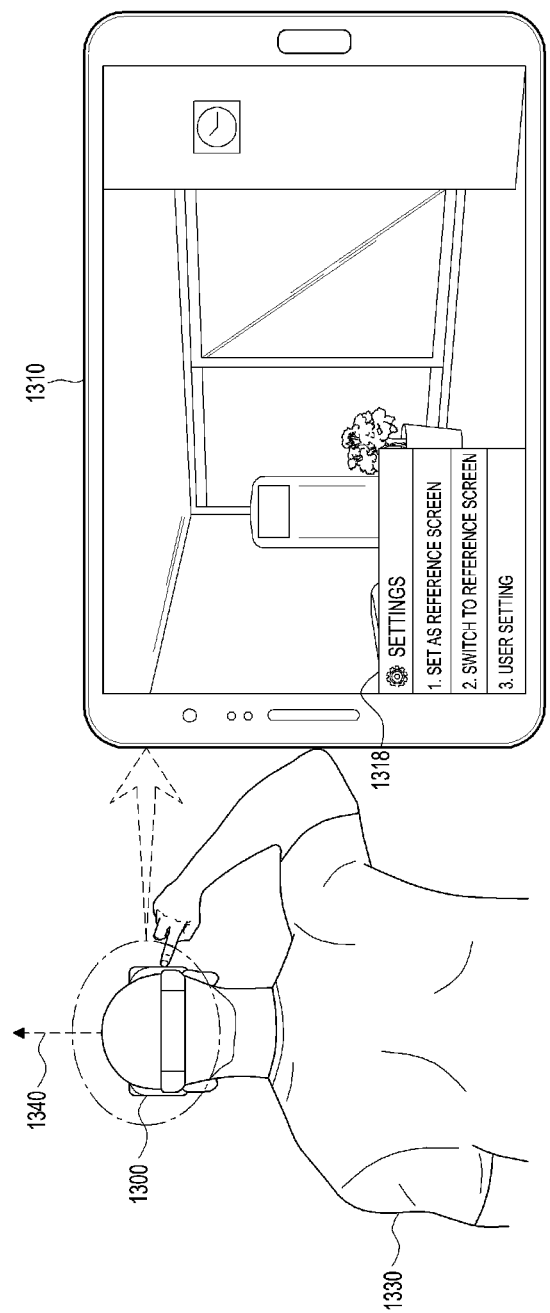
Figure 13C:
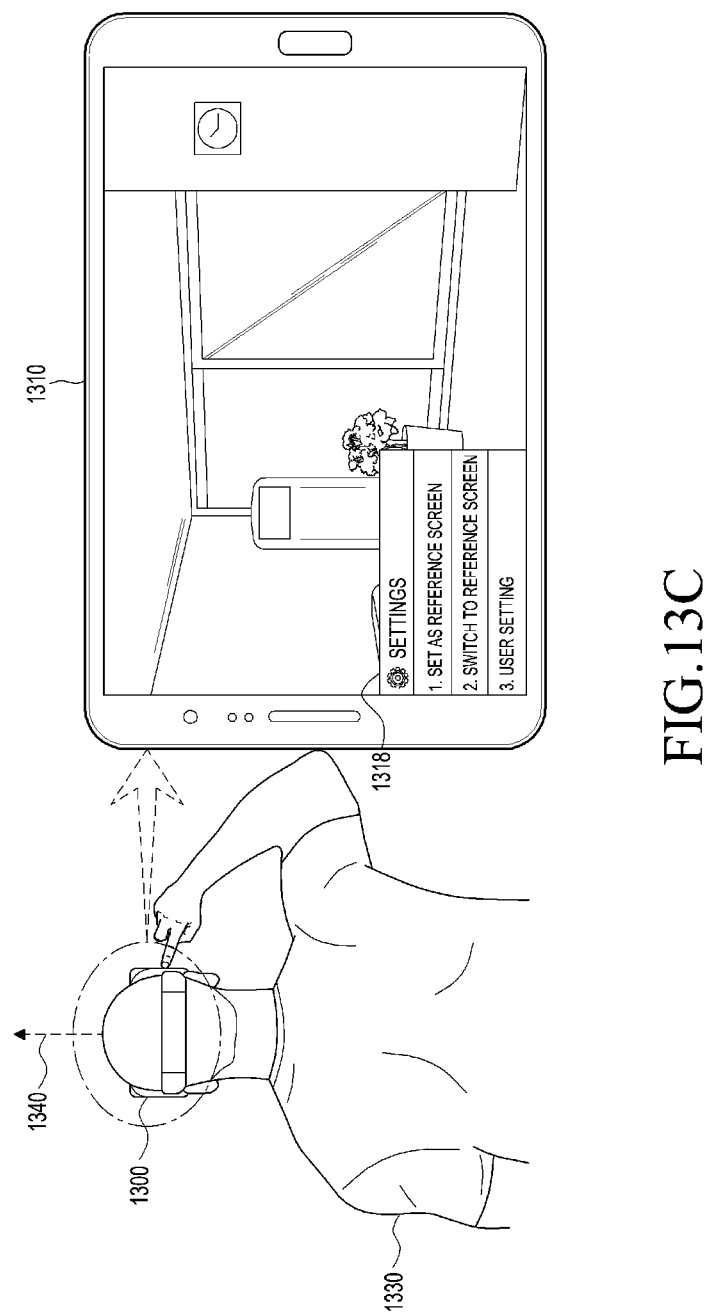

FIGS. 13A, 13B, and 13C are views illustrating an operation for storing screen information for determining a reference screen through a user input to a second electronic device according to various embodiments of the present disclosure.

Referring to FIG. 13A, a processor (for example, the processor 120) of a first electronic device 1310 may control display of a screen that provides a VR on a display module (for example, the display 150) of the first electronic device 1310 directed in a direction 1340.

Referring to FIG. 13B, a user input by a first user 1330 for executing a user menu 1318 may be received during display of the screen. Upon receipt of the user input, the processor may control display of the user menu 1318. The user input may be received through the first or second electronic device 1310 or 1300.

Referring to FIGS. 13C and 13D, upon occurrence of a reference screen setting event, the processor may control display of information related to the screen displayed on the first electronic device 1310 in a storage module (for example, the memory 130), as illustrated in FIG. 13C.

The description given with reference to FIGS. 6A to 11C may apply to a case in which a reference screen is displayed according to the embodiments illustrated in FIGS. 13A, 13B, and 13C.

FIGS. 14A to 14D are views illustrating an operation for displaying a reference screen through a user input to a second electronic device according to various embodiments of the present disclosure.

Figure 14A:
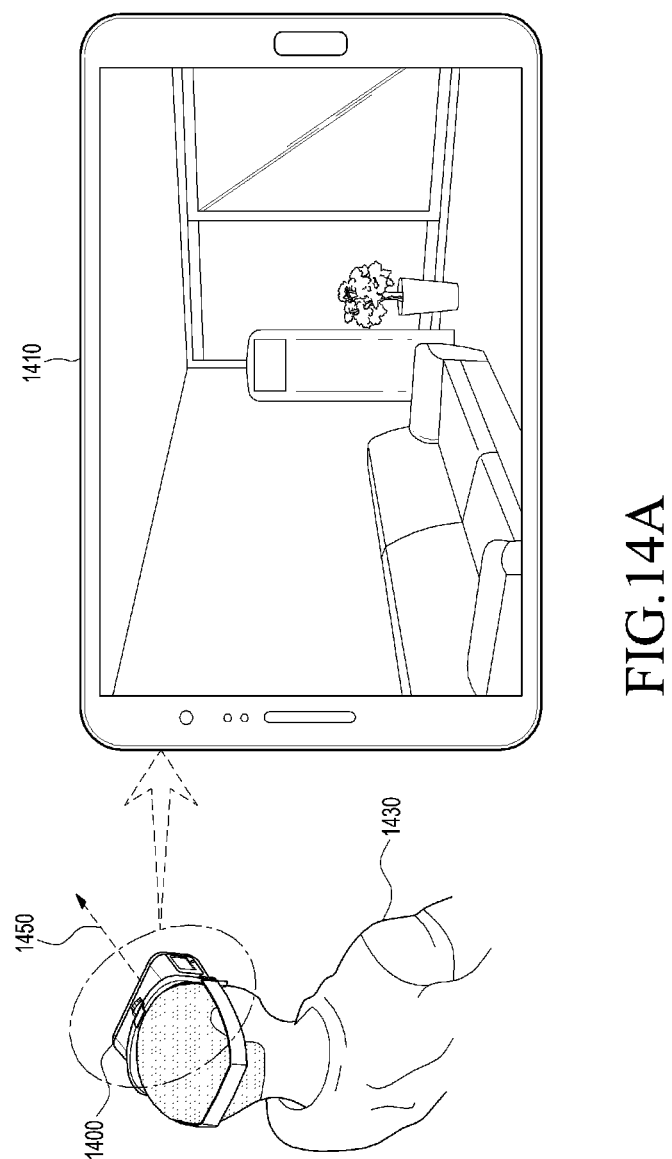
FIGS. 14A, 14B, 14C, and 14D are views illustrating an operation for displaying a reference screen through a user input to a second electronic device according to various embodiments of the present disclosure.
Figure 14B:
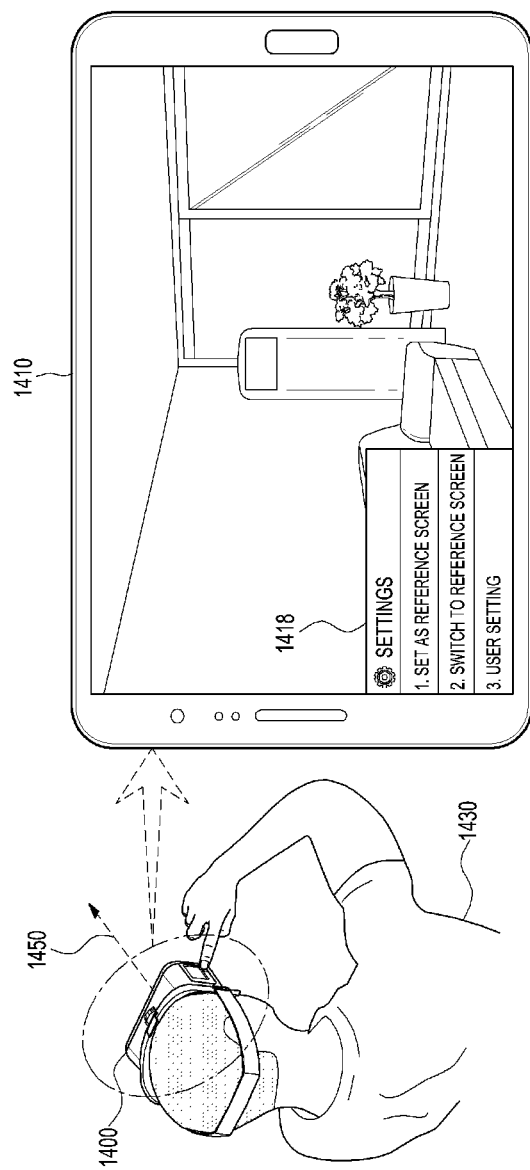
Figure 14C:
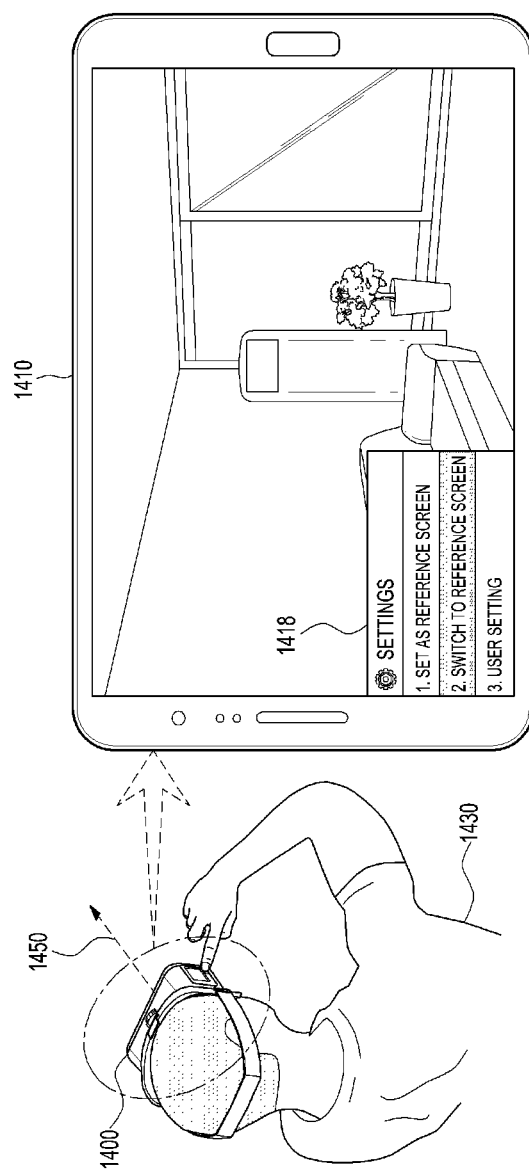
Figure 14D:
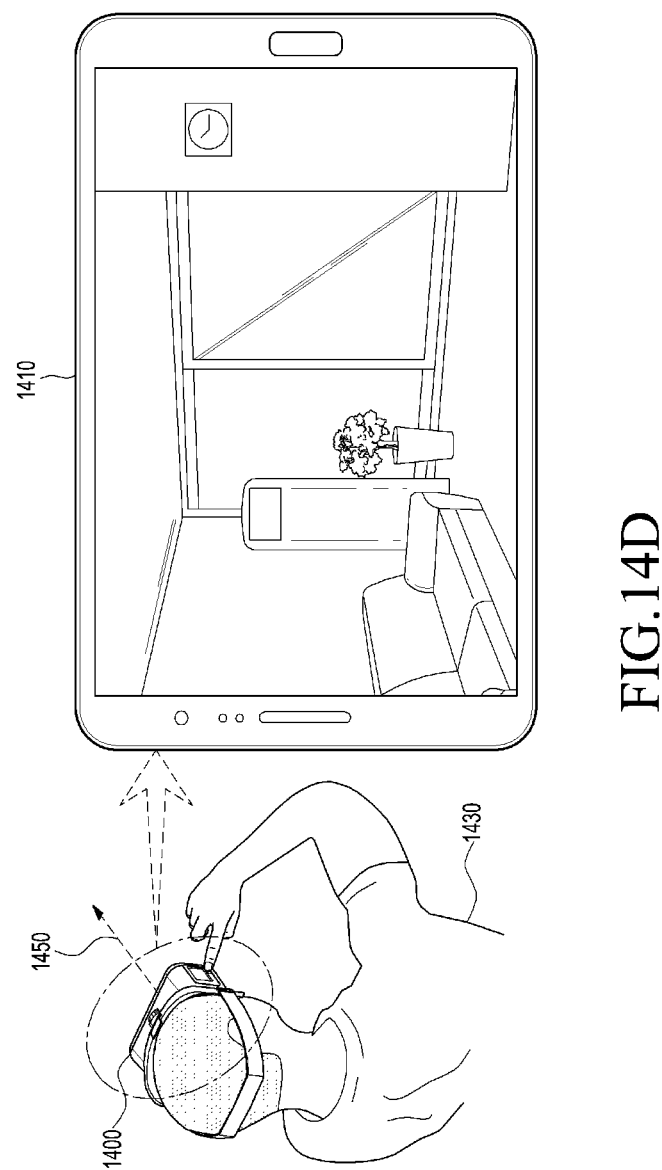

Referring to FIG. 14A, a screen matching an eye direction 1450 of a first user 1430 wearing a second electronic device 1400 may be displayed on a first electronic device 1410. Referring to FIG. 14B, upon receipt of a request for displaying a user menu 1418 from the first user 1430, a processor may control display of the user menu 1418. As illustrated in FIG. 14C, upon receipt of the input of the first user as a reference screen display event, the processor may control display of a reference screen on a display module.

The description given with reference to FIGS. 6A to 11C may apply to a case in which a reference screen is displayed according to the embodiments illustrated in FIGS. 14A to 14D.

According to various embodiments of the present disclosure, an electronic device may include a display module, a storage module connected functionally to the display module, and a processor for detecting a reference screen setting event in relation to a screen displayed on the display module and controlling storage of information about the displayed screen in the storage module. Upon occurrence of a reference screen display event, the processor may control display of a reference screen on the display module based on the information about the screen.

According to various embodiments of the present disclosure, the electronic device may be worn on a user through a head-mounted electronic device. In the electronic device according to various embodiments of the present disclosure, the reference screen setting event may include an action of removing the electronic device from the user, an action of wearing the electronic device, or an action of sensing at least one user input related to the electronic device.

In the electronic device according to various embodiments of the present disclosure, the reference screen display event may include an action of wearing the electronic device or an action of sensing at least one user input related to the electronic device.

According to various embodiments of the present disclosure, the electronic device may further include a sensor module for determining whether the user wears or removes the electronic device.

According to various embodiments of the present disclosure, the head-mounted electronic device may further include a sensor module for determining whether the user wears or removes the head-mounted electronic device.

According to various embodiments of the present disclosure, the reference screen may include the same screen as displayed on the electronic device at a time point when the reference screen setting event was occurred.

According to various embodiments of the present disclosure, the reference screen may include a screen shifted a predetermined viewing angle from a screen that was displayed on the electronic device at the time point when the reference screen setting event was occurred.

According to various embodiments of the present disclosure, the reference screen may include a history screen that has been displayed on the electronic device for a predetermined time according to an eye direction of the user.

According to various embodiments of the present disclosure, the processor may control display of a user interface indicating an attribute of the reference screen along with the reference screen on the electronic device.

According to various embodiments of the present disclosure, the electronic device may include an input module for controlling an attribute of the history screen.

According to various embodiments of the present disclosure, upon receipt of a request for controlling an attribute of the reference screen through the input module, the processor may control the reference screen according to the received request.

According to various embodiments of the present disclosure, the reference screen may include a screen scaled up or scaled down at a predetermined rate based on a screen that was displayed on the electronic device at the time point when the reference screen setting event was occurred.

Figure 15:
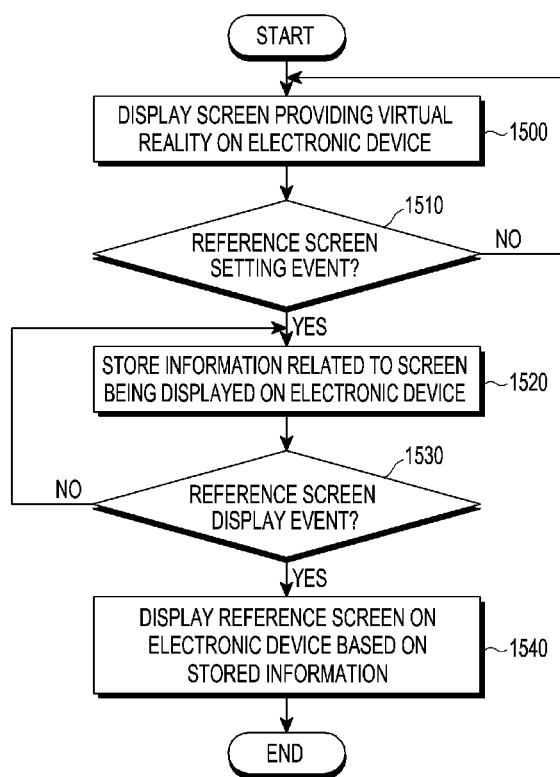
FIG. 15 is a flowchart illustrating a method for controlling an electronic device according to various embodiments of the present disclosure.

FIG. 15 is a flowchart illustrating a method for controlling an electronic device according to various embodiments of the present disclosure.

Referring to FIG. 15, an electronic device (for example, the first electronic device 610) may display a screen that provides a VR environment in operation 1500. The electronic device may determine whether a reference screen setting event has occurred in operation 1510. Upon occurrence of the reference screen setting event, the electronic device may store information about a screen being displayed on the electronic device in operation 1520. The electronic device may determine whether a reference screen display event has occurred in operation 1530. Upon occurrence of the reference screen display event, the electronic device may display a reference screen based on the stored information in operation 1540.

According to various embodiments of the present disclosure, a method for controlling an electronic device may include an operation for detecting a reference screen setting event in relation to a screen displayed on the electronic device, an operation for storing at least part of information about the screen being displayed on the electronic device in response to the detected reference screen setting event, an operation for detecting a reference screen display event, and an operation for displaying a reference screen based on the stored information in response to the reference screen display event.

In the method for controlling an electronic device according to various embodiments of the present disclosure, the electronic device may be worn on a user through a head-mounted electronic device.

In the method for controlling an electronic device according to various embodiments of the present disclosure, the reference screen setting event may include an action of removing the electronic device from the user, an action of wearing the electronic device, or an action of sensing at least one user input related to the electronic device.

In the method for controlling an electronic device according to various embodiments of the present disclosure, the reference screen display event may include an action of wearing the electronic device or an action of sensing at least one user input related to the electronic device.

In the method for controlling an electronic device according to various embodiments of the present disclosure, the electronic device may include a sensor module for determining whether the user wears or removes the electronic device.

In the method for controlling an electronic device according to various embodiments of the present disclosure, the head-mounted electronic device may include a sensor module for determining whether the user wears or removes the head-mounted electronic device.

In the method for controlling an electronic device according to various embodiments of the present disclosure, the reference screen may include the same screen as displayed on the electronic device at a time point when the reference screen setting event was occurred.

In the method for controlling an electronic device according to various embodiments of the present disclosure, the reference screen may include a screen shifted a predetermined viewing angle from a screen that was displayed on the electronic device at the time point when the reference screen setting event was occurred.

In the method for controlling an electronic device according to various embodiments of the present disclosure, the reference screen may include a history screen that has been displayed on the electronic device for a predetermined time according to an eye direction of the user.

The method for controlling an electronic device according to various embodiments of the present disclosure may include an operation for displaying a user interface indicating an attribute of the reference screen along with the reference screen on the electronic device.

In the method for controlling an electronic device according to various embodiments of the present disclosure, the electronic device may include an input module for controlling an attribute of the history screen.

The method for controlling an electronic device according to various embodiments of the present disclosure may further include, upon receipt of a request for controlling an attribute of the reference screen through the input module, controlling the reference screen according to the received request.

In the method for controlling an electronic device according to various embodiments of the present disclosure, the reference screen may include a screen scaled up or scaled down at a determined rate based on a screen that was displayed on the electronic device at the time point when the reference screen setting event was occurred.

Figure 16:
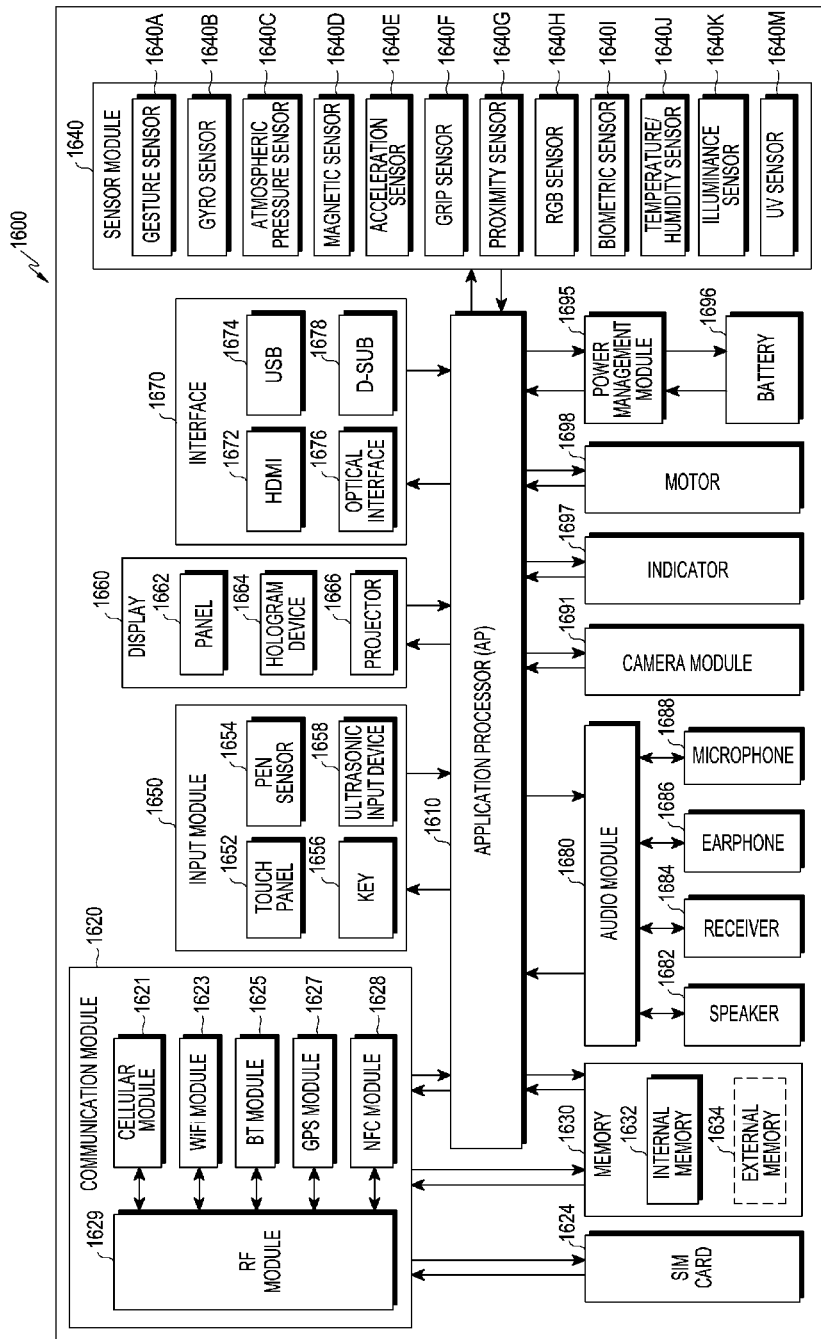
FIG. 16 is a block diagram of a first electronic device according to various embodiments of the present disclosure or an electronic device to which a method for controlling the first electronic device is applicable.

FIG. 16 is a block diagram of a first electronic device or an electronic device to which a method for controlling the first electronic device is applicable according to various embodiments of the present disclosure.

An electronic device 1600 may be, for example, a whole or a part of the electronic device 101 illustrated in FIG. 1.

Referring to FIG. 16, the electronic device 1600 may include one or more application processors (APs) 1610, a communication module 1620, a subscriber identification module (SIM) card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 may control one or more hardware or software components that are connected to the AP 1610 by executing an OS or an application program and may perform processing or computation of various types of data including multimedia data. The AP 1610 may be implemented, for example, as a SoC. According to an embodiment, the AP 1610 may further include a graphics processing unit (GPU; not shown).

The communication module 1620 (for example, the communication interface 160) may transmit and receive data in communication between the electronic device 1600 (for example, the electronic device 201) and other electronic devices (for example, the electronic device 104 or the server 106). According to an embodiment, the communication module 1620 may include a cellular module 1621, a WiFi module 1623, a BT module 1625, a GPS module 1627, an NFC module 1628, and a RF module 1629.

The cellular module 1621 may provide services such as voice call, video call, SMS, or the Internet, via a communication network (for example, LTE, LTE-A, CDMA, WCDMA, UMTS, WiBro, or GSM). The cellular module 1621 may identify and authenticate electronic devices within a communication network, using a SIM card (for example, the SIM card 1624). According to an embodiment, the cellular module 1621 may perform at least a part of the functionalities of the AP 1610. For example, the cellular module 1621 may perform at least a part of multimedia control functionality.

According to an embodiment, the cellular module 1621 may include a communication processor (CP). The cellular module 1621 may, for example, be implemented as an SoC. Although components such as the cellular module 1621 (for example, the CP), the memory 1630, or the power management module 1695 are shown in FIG. 16 as configured separately from the AP 1610, the AP 1610 may include, or be integrated with, one or more of the foregoing components (for example, the cellular module 1621).

According to an embodiment, the AP 1610 or the cellular module 1621 (for example, the CP) may process instructions or data received from at least one of a non-volatile memory or other components by loading the instructions or the data in a volatile memory. Also, the AP 1610 or the cellular module 1621 may store at the non-volatile memory at least one of data received from at least one of other components or data generated by at least one of the other components.

Each of the WiFi module 1623, the BT module 1625, the GPS module 1627, and the NFC module 1628 may include, for example, a processor that may process data received or transmitted by the respective modules. Although FIG. 16 shows the cellular module 1621, the WiFi module 1623, the BT module 1625, the GPS module 1627, and the NFC module 1628 as separate components, any combination (for example, two or more) of the cellular module 1621, the WiFi module 1623, the BT module 1625, the GPS module 1627, and the NFC module 1628 may be included in an IC or an IC package according to an embodiment. For example, at least some of the processors corresponding to the respective cellular module 1621, the WiFi module 1623, the BT module 1625, the GPS module 1627, or the NFC module 1628 may be implemented as a single SoC. For example, a CP corresponding to the cellular module 1621 and a WiFi processor corresponding to the WiFi module 1623 may be implemented as a single SoC.

The RF module 1629 may transmit and receive data, for example, RF signals. While not shown, the RF module 1629 may include a transceiver, a power amplifier module (PAM), a frequency filter, or a low noise amplifier (LNA). The RF module 1629 may further include one or more components for transmitting and receiving electro-magnetic (EM) waves in free space, such as conductors or conductive wires. Although FIG. 16 shows that the cellular module 1621, the WiFi module 1623, the BT module 1625, the GPS module 1627, and the NFC module 1628 share the single RF module 1629, at least one of the cellular module 1621, the WiFi module 1623, the BT module 1625, the GPS module 1627, or the NFC module 1628 may transmit and receive RF signals via a separate RF module according to an embodiment.

The SIM card 1624 may be a card including a SIM, and may be configured to be inserted into a slot disposed at a specified location of the electronic device. The SIM card 1624 may include a unique identifier (for example, integrated circuit card IDentifier (ICCID)) or subscriber information (for example, international mobile subscriber identity (IMSI)).

The memory 1630 (for example, the memory 130) may include an internal memory 1632 or an external memory 1634. The internal memory 1632 may be at least one of, for example, a volatile memory (for example, dynamic RAM (DRAM), static RAM (SRAM), or synchronous Dynamic RAM (SDRAM)) or a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, or NOR flash memory).

According to an embodiment, the internal memory 1632 may be a solid state drive (SSD). The external memory 1634 may be, for example, a flash drive (for example, a compact flash (CF) drive, a secure digital (SD), a micro secure digital (micro-SD), a mini secure digital (mini-SD), an extreme digital (xD), or a Memory Stick). The external memory 1634 may be operatively coupled to the electronic device 1600 via various interfaces. According to an embodiment, the electronic device 1600 may further include recording devices (or recording media) such as a hard disk drive (HDD).

The sensor module 1640 may measure physical properties or detect operational states associated with the electronic device 1600, and convert the measured or detected information into electric signals. The sensor module 1640 may include at least one of, for example, a gesture sensor 1640A, a gyro sensor 1640B, an atmospheric pressure sensor 1640C, a magnetic sensor 1640D, an accelerometer sensor 1640E, a grip sensor 1640F, a proximity sensor 1640G, a color sensor 1640H (for example, a red, green, blue (RGB) sensor), a biometric sensor 1640I, a temperature/humidity sensor 1640J, an illuminance sensor 1640K, or an ultra violet (UV) sensor 1640M. Additionally or alternatively, the sensor module 1640 may include, for example, an electrical-nose sensor (not shown), an EMG sensor (not shown), an EEG sensor (not shown), an IR sensor (not shown), an iris sensor (not shown), or a finger print sensor. The sensor module 1640 may further include a control circuit for controlling one or more sensors included therein.

The input device 1650 may include a touch panel 1652, a (digital) pen sensor 1654, a key 1656, or an ultrasonic input device 1658. The touch panel 1652 may detect a touch input using at least one of, for example, capacitive, resistive, infrared, and ultrasonic methods. The touch panel 1652 may further include a control circuit. A capacitive-type touch panel may detect physical touch inputs or proximity inputs. The touch panel 1652 may further include a tactile layer, which may provide haptic feedback to the user.

The (digital) pen sensor 1654 may be implemented, for example, using methods identical to or similar to receiving a touch input from a user, or using a separate detection sheet. The key 1656 may include, for example, a physical button, an optical key, or a keypad. The ultrasonic input device 1658 may be a device configured to identify data by detecting, using a microphone (for example, a microphone 1688), ultrasonic signals generated by a device capable of generating the ultrasonic signal. The ultrasonic input device 1658 may detect data wirelessly. According to an embodiment, the electronic device 1600 may receive a user input from an external device (for example, a computer or a server) connected to the electronic device 1600 using the communication module 1620.

The display module 1660 (for example, the display 150) may include a panel 1662, a hologram device 1664, or a projector 1666. The panel 1662 may be, for example, a LCD or an active-matrix organic light-emitting diode (AM-OLED) display. The panel 1662 may be configured to be, for example, flexible, transparent, or wearable. The panel 1662 and the touch panel 1652 may be implemented as a single module. The hologram device 1664 may utilize the interference of light waves to provide a three-dimensional image in empty space. The projector 1666 may provide an image by projecting light on a display. The display may be positioned, for example, inside or outside the electronic device 1600. According to an embodiment, the display module 1660 may further include a control circuit for controlling the panel 1662, the hologram device 1664, or the projector 1666.

The interface 1670 may include, for example, a high-definition multimedia interface (HDMI) 1672, a USB 1674, an optical interface 1676, or a D-sub 1678. The interface 1670 may be incorporated into, for example, the communication interface 160 illustrated in FIG. 1. Additionally or alternatively, the interface 1670 may include, for example, a mobile high-definition link (MHL) interface, an SD/Multi-Media Card, or an infrared data association (IrDA) interface.

The audio module 1680 may encode/decode a voice into an electrical signal, and vice versa. At least a part of components of the audio module 1680 may be incorporated in, for example, the I/O interface 140 illustrated in FIG. 1. The audio module 1680 may process audio information input into, or output from, for example, a speaker 1682, a receiver 1684, an earphone 1686, or the microphone 1688.

The camera module 1691 may capture still images or a video. According to an embodiment, the camera module 1691 may include one or more image sensors (for example, a front sensor or a rear sensor), a lens (not shown), an image signal processor (ISP, not shown), or a flash (for example, a LED or a Xenon lamp, not shown).

The power management module 1695 may manage power of the electronic device 1600. While not shown, the power management module 1695 may include, for example, a PMIC, a charger IC, or a battery or fuel gauge.

The PMIC may be disposed, for example, in an IC or an SoC semiconductor. The charging method for the electronic device 1600 may include wired or wireless charging. The charger IC may charge a battery, or prevent excessive voltage or excessive current from a charger from entering the electronic device 1201. According to an embodiment, the charger IC may include at least one of a wired charger IC or a wireless charger IC. The wireless charger IC may be, for example, a magnetic resonance type, a magnetic induction type or an electromagnetic wave type, and may include additional circuits for wireless charging, such as a coil loop, a resonance circuit, or a rectifier.

The battery gauge may measure, for example, a charge level, a voltage while charging, current, or temperature of the battery 1696. The battery 1696 may store or generate electricity and supply power to the electronic device 1600 using the stored or generated electricity. The battery 1696 may include, for example, a rechargeable battery or a solar battery.

The indicator 1697 may indicate one or more states (for example, boot status, message status, or charge status) of the electronic device 1600 or a part of the electronic device 1600 (for example, the AP 1610). The motor 1698 may convert an electrical signal into a mechanical vibration. While not shown, the electronic device 1600 may include a device for supporting mobile TV (for example, a GPU). The device for supporting mobile TV may process media data compliant with, for example, digital multimedia broadcasting (DMB), digital video broadcasting (DVB), or Media Flow.

Each of components of an electronic device described above according to the present disclosure may include one or more components, and each component's name may vary according to the type of the electronic device. The electronic device according to the present disclosure may include at least one of the above-described components, and some may be omitted or additional components may be included. Also, some of the components of the hardware according to the present disclosure may be combined into a single component and perform functions identical to those of the respective components before their combination. Similarly, some of the components of the hardware according to the present disclosure may be split into a plurality of entities that collectively perform functions identical to those of the respective component before their split.

The term "module" as used herein may include its ordinary meaning including, but not limited to, for example, a unit of one, or a combination of two or more, hardware, software or firmware. The term "module" may be used interchangeably with a term such as unit, logic, logical block, component, or circuit. A module may be the smallest unit for performing one or more functions, or a portion thereof. A module may be implemented mechanically or electronically. For example, a module according to the present disclosure may include at least one of a known or to-be-developed application-specific integrated circuit (ASIC) chip, field-programmable gate array (FPGA) or programmable logic device that perform certain operations.

According to various embodiments, at least a part of devices (for example, modules or their functions) or methods (for example, operations) according to the present disclosure may be implemented, for example, in the form of a programming module, as commands stored in a non-transitory computer-readable storage medium. When a command is executed by one or more processors (for example, the processor 120), the one or more processors may execute a function corresponding to the command. The non-transitory computer-readable storage medium may be, for example, the memory 130. At least a part of the programming module may be implemented (for example, executed) by the processor 120. At least a part of the programming module may include, for example, a module, a program, a routine, a set of instructions, and/or a process to execute one or more functions.

The non-transitory computer-readable recording medium may include any kind of hardware device configured specially to store a program command (for example, a programming module). Examples of the hardware device may include magnetic media such as a hard disk, floppy disk, and a magnetic tape, optical media such as a compact disc read only memory (CD-ROM) and a digital versatile disc (DVD), magneto-optical media such as a floptical disk, a ROM, a RAM, a flash memory, and the like. The program command may include a premium language code that can be executed in a computer using an interpreter as well as a mechanical code produced by a compiler. The above-mentioned hardware device may be implemented as one or more software modules to perform the operations of the present disclosure and vice versa.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner, and some operations may be omitted or additional operations may be added.

According to various embodiments, the non-transitory computer-readable storage medium storing commands is provided. The commands are configured to allow at least one processor to perform at least one operation, when the commands are executed by the at least one processor. In the non-transitory computer-readable storage medium including the command, the at least one operation may include sensing a reference screen setting event in relation to a screen being displayed on the electronic device, storing at least part of information about the screen being displayed on the electronic screen in response to the reference screen setting event, sensing a reference screen display event, and displaying a reference screen on the electronic device based on the information in response to the reference screen display event.

As is apparent from the foregoing description of various embodiments of the present disclosure, when a head-mounted electronic device is removed from a user and then worn on the user or another user, a screen being displayed on an electronic device (for example, a portable terminal) mounted to the head-mounted electronic device at a time point of the removal may be provided to the user or the other user. Accordingly, the user or the other user can view the screen that was being displayed on the electronic device at the time point of the removal irrespective of the eye direction of the user or the other user.

Further, when the head-mounted electronic device is removed from the user and then worn on the user or the other user, the head-mounted electronic device can provide the user or the other user with a screen being displayed on an electronic device (for example, a portable terminal) mounted to the head-mounted electronic device at a time point when the user wore the head-mounted electronic device. Accordingly, the user or the other user can view the screen that was being displayed on the electronic device at the time point of the wearing irrespective of the eye direction of the user or the other user.

Also, upon request of the user for viewing a determined reference screen, a screen may be switched to the reference screen without the need for the user's moving an eye direction.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a display;
   a memory;
   and
   a processor, the processor being configured to:
      identify that a head-mounted device, which is operatively and physically connected to the electronic device, is worn by a user,
      in response to the identifying that the head-mounted device is worn by the user, display a first screen on the display,
      identify that the head-mounted device is removed from the user,
      in response to the identifying that the electronic device is removed from the user, store, in the memory, information for a second screen, which is different screen from the first screen, being displayed on the display at a moment of removing the electronic device from the user, the second screen being a screen according to a first eye direction of the user, and
      identify that the head-mounted device is worn by the user having a second eye direction,
      in response to the identifying that the head-mounted device is worn by the user having the second eye direction, display the second screen on the display based on the stored information for the second screen,
   wherein the first eye direction and the second eye direction are different directions from each other.

2. The electronic device of claim 1, wherein, when the processor detects at least one user input related to the electronic device, the processor is further configured to store, in the memory, the information for the second screen being displayed on the display at the moment of detecting the at least one user input.

3. The electronic device of claim 1, wherein the second screen, being displayed on the electronic device when the head-mounted device is worn by the user having the second eye direction, includes a screen shifted a predetermined viewing angle from the second screen being displayed on the electronic device at the moment of removing the electronic device from the user.

4. The electronic device of claim 1, wherein the second screen, being displayed on the electronic device when the head-mounted device is worn by the user having the second eye direction, includes a history screen displayed for a predetermined time according to an eye tracking of the user, with respect to a screen being displayed on the electronic device.

5. The electronic device of claim 4, wherein, upon receipt of a request for controlling the attribute of the second screen, being displayed on the electronic device when the head-mounted device is worn by the user having the second eye direction, the processor is further configured to control the second screen according to the received request.

6. The electronic device of claim 1, wherein the second screen, being displayed on the electronic device when the head-mounted device is worn by the user having the second eye direction, includes a screen scaled up or scaled down at a predetermined rate based on the second screen being displayed on the electronic device at the moment of removing the head-mounted device from the user.

7. A method for controlling an electronic device, the method comprising:
identifying that a head-mounted device, which is operatively and physically connected to the electronic device, is worn by a user,
in response to the identifying that the head-mounted device is worn by the user, displaying a first screen on the display,
identifying that the head-mounted device is removed from the user,
in response to the identifying that the electronic device is removed from the user, storing, in the memory, information for a second screen, which is different screen from the first screen, being displayed on the display at a moment of removing the electronic device from the user, the second screen being a screen according to a first eye direction of the user, and
identifying that the head-mounted device is worn by the user having a second eye direction,
in response to the identifying that the head-mounted device is worn by the user having the second eye direction, displaying the second screen on the display based on the stored information for the second screen,
wherein the first eye direction and the second eye direction are different directions from each other.

8. The method of claim 7, further comprising:
when detecting at least one user input related to the electronic device, storing the information for the second screen being displayed on the display at the moment of detecting the at least one user input.

9. The method of claim 7, wherein the second screen, being displayed on the electronic device when the head-mounted device is worn by the user having the second eye direction, includes a screen shifted a predetermined viewing angle from the second screen being displayed on the electronic device at the moment of removing the electronic device from the user.

10. The method of claim 7, wherein the second screen, being displayed on the electronic device when the head-mounted device is worn by the user having the second eye direction, includes a history screen displayed for a predetermined time according to an eye tracking of the user, with respect to a screen being displayed on the electronic device.

11. The method of claim 7, wherein the second screen, being displayed on the electronic device when the head-mounted device is worn by the user having the second eye direction, includes a screen scaled up or scaled down at a predetermined rate based on the second screen being displayed on the electronic device at the moment of removing the head-mounted device from the user.

12. A non-transitory computer-readable recording medium storing instructions for performing at least one operation by a processor, wherein the at least one operation includes:
identifying that a head-mounted device, which is operatively and physically connected to the electronic device, is worn by a user,
in response to the identifying that the head-mounted device is worn by the user, displaying a first screen on the display,
identifying that the head-mounted device is removed from the user,
in response to the identifying that the electronic device is removed from the user, storing, in the memory, information for a second screen, which is different screen from the first screen, being displayed on the display at a moment of removing the electronic device from the user, the second screen being a screen according to a first eye direction of the user, and
identifying that the head-mounted device is worn to the user having a second eye direction,
in response to the identifying that the head-mounted device is worn by the user having the second eye direction, displaying the second screen on the display based on the stored information for the second screen,
wherein the first eye direction and the second eye direction are different directions from each other.

* * * * *